United States Patent
Mitra et al.

(10) Patent No.: US 10,719,715 B2
(45) Date of Patent: Jul. 21, 2020

(54) METHOD AND SYSTEM FOR ADAPTIVELY SWITCHING DETECTION STRATEGIES FOR WATERMARKED AND NON-WATERMARKED REAL-TIME TELEVISED ADVERTISEMENTS

(71) Applicant: Silveredge Technologies Pvt. Ltd., Gurgaon (IN)

(72) Inventors: Debasish Mitra, Gurgaon (IN); Hitesh Chawla, Gurgaon (IN)

(73) Assignee: Silveredge Technologies Pvt. Ltd., Gurgaon (IN)

( * ) Notice: Subject to any disclaimer, the term of this patent is extended or adjusted under 35 U.S.C. 154(b) by 47 days.

(21) Appl. No.: 16/003,018

(22) Filed: Jun. 7, 2018

(65) Prior Publication Data
US 2018/0357490 A1   Dec. 13, 2018

(30) Foreign Application Priority Data

Jun. 7, 2017   (IN) .............................. 201711019934

(51) Int. Cl.
*G06K 9/62* (2006.01)
*G06K 9/00* (2006.01)
(Continued)

(52) U.S. Cl.
CPC ..... *G06K 9/00751* (2013.01); *G06K 9/00744* (2013.01); *G06K 9/4671* (2013.01); *G06K 9/527* (2013.01); *G06K 9/6215* (2013.01); *G06K 9/6219* (2013.01); *G06K 9/6272* (2013.01); *G06K 9/6276* (2013.01); *G06N 5/003* (2013.01); *G06N 7/00* (2013.01); *H04L 65/4076* (2013.01); *H04N 21/44008* (2013.01); *H04N 21/812* (2013.01); *H04N 21/8358* (2013.01); *G06K 2009/4666* (2013.01); *H04N 21/4394* (2013.01)

(58) Field of Classification Search
CPC ......... H04N 21/8358; H04N 21/44008; H04N 21/812; H04N 21/4394; G06K 9/4671; G06K 9/6219; G06K 9/6215; G06K 9/527; G06K 9/00744; G06K 9/6272; G06K 2009/4666; G06N 5/003; H04L 65/4076
See application file for complete search history.

(56) References Cited

U.S. PATENT DOCUMENTS 6,460,036 B1 * 10/2002  Herz ...................... G06Q 30/02
                                                            707/748
7,233,948 B1 *  6/2007  Shamoon ....... H04N 21/234318
(Continued)

*Primary Examiner* — Samir A Ahmed
(74) *Attorney, Agent, or Firm* — Kolisch Hartwell, P.C.

(57) ABSTRACT

The present disclosure provides a computer-implemented method and system for adaptively switching supervised detection strategy for watermarked and non-watermarked real time televised video advertisements. The televised video advertisements are present in a live stream of a media content of a broadcasted channel. The method includes selection of a set of frames per second from the media content. The method includes checking for one or more watermarked features in each selected frame of the media content. The method includes switching to a first detection strategy. The first detection strategy is associated with detection of a first ad in the live stream of the media content when the one or more watermarked feature are present in each checked frame in the selected set of frames.

18 Claims, 8 Drawing Sheets

(51) Int. Cl.
*H04N 21/81* (2011.01)
*H04L 29/06* (2006.01)
*G06N 7/00* (2006.01)
*H04N 21/44* (2011.01)
*G06N 5/00* (2006.01)
*G06K 9/52* (2006.01)
*G06K 9/46* (2006.01)
*H04N 21/8358* (2011.01)
*H04N 21/439* (2011.01)

(56) References Cited

U.S. PATENT DOCUMENTS

| | | | | |
|---|---|---|---|---|
| 9,510,044 | B1* | 11/2016 | Pereira | H04N 21/44008 |
| 2002/0069218 | A1* | 6/2002 | Sull | G06T 3/4092 |
| | | | | 715/202 |
| 2004/0107356 | A1* | 6/2004 | Shamoon | H04L 63/0428 |
| | | | | 713/193 |
| 2008/0013724 | A1* | 1/2008 | Shamoon | H04L 63/0428 |
| | | | | 380/201 |
| 2009/0254971 | A1* | 10/2009 | Herz | G06Q 10/10 |
| | | | | 726/1 |
| 2013/0014153 | A1* | 1/2013 | Bhatia | H04N 21/252 |
| | | | | 725/24 |
| 2013/0158984 | A1* | 6/2013 | Myslinski | G06F 17/28 |
| | | | | 704/9 |

* cited by examiner

US 10,719,715 B2

METHOD AND SYSTEM FOR ADAPTIVELY SWITCHING DETECTION STRATEGIES FOR WATERMARKED AND NON-WATERMARKED REAL-TIME TELEVISED ADVERTISEMENTS

TECHNICAL FIELD

The present invention relates to the field of computer vision and machine learning and, in particular, relates to switching detection strategies for watermarked and non-watermarked real time televised video advertisements.

BACKGROUND

With the proliferation and penetration of internet and televised media network in recent years, the affordability and access of media networks has concurrently grown. With such penetration and public viewership, advertisers have shifted to the internet space and televised media networks for promoting their products and services. The demand for ad space has increased in the televised media networks concurrently with an increase in number of broadcasted channels. These advertisers, publishers and content distributors need to closely monitor airing of advertisements across multiple broadcasted television channels and socials networks. The need for faster ad analytics across multiple channels and platforms is witnessed with adoptions of competitive bidding between advertisers for booking ad space.

A television broadcast essentially consists of videos of scheduled programs and sponsored advertisements. Each advertisement video is generally scheduled to run for 10 to 35 seconds approximately on multiple channels at different or same time. The advertisements are provided by advertisers to run in between the scheduled broadcast of the program on each channel. Traditionally, these advertisements are either detected manually by assigning each user for each channel to records ads related data. In technological approaches, the use of supervised detection of key features of the ad in the stream of the broadcast is performed. The approach focuses on detection of advertisements by extracting and analyzing digital audio fingerprints. The audio fingerprints are probabilistically matched with similar fingerprints in a master database. The probabilistic match is analyzed for positive validation of the airing media as an ad.

The present solutions have several disadvantages. The present solutions are inefficient for removing redundancy of false positives in ad detection. The use of audio fingerprints for detecting the ad increases the error rate with the use of similar audio tones and fingerprints in non-ad content. The time for detection of the advertisement also increases with the usage of computationally inefficient and error prone techniques of supervised audio fingerprinting. The increase in detection time affects the synchronization and operations of cross platform ad campaigns. These solutions detect same ad with the different language of communication on different native language channels as different ads. These solutions are not language or completely platform agnostic. In addition, these solutions lack the precision and accuracy to differentiate programs from advertisements.

In light of the above stated discussion, there is a need for a method and system which overcomes the above stated disadvantages.

SUMMARY

In an aspect, the present disclosure provides a computer-implemented method for adaptively switching supervised detection strategy for watermarked and non-watermarked real time televised video advertisements. The televised video advertisements are present in a live stream of a media content of a broadcasted channel. The computer-implemented method includes a first step of selecting a set of frames per second from a pre-defined set of frames in each second of the live stream of the media content. The computer-implemented method includes another step of checking for one or more watermarked features in each selected frame of the set of frames in the live stream of the media content. Further, the computer-implemented method includes yet another step of switching to a first detection strategy. The first detection strategy is associated with detection of a first ad in the live stream of the media content when the one or more watermarked feature are present in each checked frame in the selected set of frames. The first detection strategy includes a first step of extracting a pre-defined number of keypoints from each selected frame of the media content. The pre-defined number of key points is extracted based on validation of at least one of scale invariance criterion, a rotation invariance criterion and a Harris score criterion. The first detection strategy includes another step of deriving a pre-defined number of binary descriptors from the pre-defined number of extracted keypoints. Each binary descriptor is characterized by a binary string with a length of 256 bits. The first detection strategy includes yet another step of assigning a weight value to each binary descriptor of the pre-defined number of binary descriptors. The weight value for each binary descriptor is L1 normalized and each normalized weight value for each binary descriptor is characterized by an arithmetic sum of 1. The first detection strategy includes yet another step of creating a special pyramid of the pre-defined number of binary descriptors to obtain a pre-defined number of spatially identifiable binary descriptors. The special pyramid is created to obtain a first vocabulary of binary descriptors of each selected frame. The first detection strategy includes yet another step of accessing a second vocabulary of binary descriptors for a curated comprehensive repository of ad frames. The curated repository of the ad frames corresponds to a comprehensive set of televised advertisements. The second vocabulary includes a set of tree structured clusters of binary descriptors. The first detection strategy includes yet another step of comparing each spatially identifiable binary descriptor in the first vocabulary with spatially identifiable binary descriptors in the second vocabulary. The first detection strategy includes yet another step of progressively scoring each selected frame from the live stream of media content for validation of the selected frame as the ad frame of the first ad. The first ad is progressively scored for each positively validated frame to obtain a progressive ad score. Moreover, the first detection strategy includes yet another step of detecting the first ad in the live stream of the media content when the progressive score for the first ad is above a threshold score.

In an embodiment of the present disclosure, the computer-implemented method includes yet another step of receiving the live stream of the media content of the broadcasted channel. The live stream of the media content includes at least one of a live ad stream and a non-ad live stream. The live ad stream includes one or more ads.

In an embodiment of the present disclosure, each selected frame in the selected set of frames differs by a frame gap of at least 8 frames. The selected set of frames from the pre-defined set of frames in the live stream of media content per second is 3 and the pre-defined set of frames per second is 25. The pre-defined number of keypoints is 700 and the pre-defined number of the binary descriptors is 700. Moreover, the pre-defined number of spatially identifiable binary descriptors is 2100.

In an embodiment of the present disclosure, the computer-implemented method includes yet another step of switching to a second detection strategy. The second detection strategy is associated with detection of the first ad in the live stream of the media content when the one or more watermarked features disappear from the checked frame. The second detection strategy includes a first step of detecting disappearance of the one or more watermarked features from the checked frame in the pre-defined set of frames in the live stream of the media content. Moreover, the second detection strategy includes another step of marking the checked frame in the pre-defined set of frames as the ad frame of the first ad. The checked frame is marked as the ad frame of the first ad based on positive detection of the disappearance of the one or more watermarked features from the checked frame.

In an embodiment of the present disclosure, the one or more watermarked features in the selected frame include at least one of a channel logo, a content logo, a content certificate and an ad certificate.

In an embodiment of the present disclosure, the second vocabulary of the binary descriptors is characterized by an n-ary tree data structure. The n-ary tree data structure includes leaf nodes. The second vocabulary includes a set of tree structured clusters of binary descriptors as the leaf nodes. The tree structured clusters of binary descriptors for the comprehensive repository of ad frames is associated with weight values. The second vocabulary of the binary descriptors is created by extracting the pre-defined number of keypoints and the binary descriptors from each frame of the repository of ad frames. The second vocabulary is further created by creating the special pyramid of the binary descriptors for each ad frame to obtain the pre-defined number of spatially identifiable binary descriptors. The second vocabulary is created by clustering the binary descriptors into a first set of clusters. The binary descriptors are clustered into the first set of clusters based on an evaluation of minimum hamming distance between each binary descriptor. Further, the binary descriptors in each cluster of the first set of clusters are iteratively clustered and each subsequent cluster is iteratively clustered for a pre-determined iteration level to obtain a set of tree structured clusters. In addition, the second vocabulary is obtained by assigning a weight value, a term frequency and an inverse document frequency to each clustered binary descriptor and normalizing each weight values using L1 normalization to obtain normalized weight values with evaluated arithmetic sum of weight values as 1.

In an embodiment of the present disclosure, each cluster in the first set of clusters and the set of tree structured clusters is associated with a centroid. The first set of cluster includes 10 clusters and 10 centroids and the set of tree structured clusters comprises $10^6$ clusters and $10^6$ centroids. The pre-determined iteration level for clustering the binary descriptors for each frame of the repository of ad frames is 6.

The binary descriptors in the first vocabulary are compared with the binary descriptors in the second vocabulary. The binary descriptors are compared by searching for a cluster in the set of tree structured clusters. The cluster that has the binary descriptor of minimum hamming distances with the binary descriptor of the selected frame is identified. Each binary descriptor in the first vocabulary of the binary descriptors for the selected frame of the media content is matched with the binary descriptor in the searched cluster for the minimum hamming distance. The Bhattacharya distance is calculated between weight values of each matched pair of the binary descriptors. The calculated Bhattacharya distance for each descriptor in the first vocabulary of the binary descriptors of the selected frame is summed to obtain a summed feature value. The summed feature value is in a normalized range of 0 to 1.

In an embodiment of the present disclosure, each selected frame for a first ad in the live stream of the media content is progressively scored in at least one or more steps. The one or more steps include a first step of comparing the summed feature value with a first threshold value for validating the selected frame as ad frame. The one or more steps includes another step of evaluating a ratio test for determining degree of difference between selected frames in the selected set of frame in the live stream of the media content. The ratio test is evaluated by dividing summed feature value for a second frame by the summed feature value for a first frame of the selected set of frames. The one or more steps include yet another step of rewarding a first ad score for a first ad of the one or more ads in the live stream of the media content by assigning a first ad score for a positive validation of the evaluated ratio. The first ad score is assigned to the first ad when the ratio is less than a second threshold value. The one or more steps includes yet another step of penalizing a second ad of the one or more ads of the media content by deducting a second score from the assigned first ad score for the second ad. The second ad is a past ad streamed before the first ad and the first ad is streamed in real time in the live stream of the media content. The one or more steps include yet another step of rewarding the first ad of the one or more ads in the live stream of the media content by adding a third score to the first ad score of the first ad. The third score is rewarded based on an equality criterion and the equality criterion is based on equality of the feature value of the first frame and the feature value of the second frame in the selected set of frames. The one or more steps include yet another step of rewarding the first ad of the one or more ads in the live stream of the media content. The first ad is rewarded by adding a fourth score to the first ad score. The fourth score is rewarded based on vicinity criterion and the vicinity criterion is based on successive positive validation of the first score for the first frame and the second frame of the set of frames. In addition, the one or more steps include yet another step of calculating the progressive ad score for the first ad and the second ad. The progressive score is calculated based on at least one of progressive addition and subtraction of the second score, the third score and the fourth score to the first ad score.

In an embodiment of the present disclosure, the first threshold value for validating comparison of the summed feature value is 0.02 and the second threshold value for validation of the evaluated ratio is 0.7. The first ad score for positive validation by the ratio test is 1.5, the second score for penalizing the second ad is 0.5, the third score for the equality criterion is 0.5 and the fourth score for the vicinity criterion is 0.5.

In an embodiment of the present disclosure, the threshold score for the detection of the first ad in the live stream of the media content is 6.

In another aspect, the present disclosure provides a computer system. The computer system includes one or more processors and a memory coupled to the one or more processors. The memory causes the one or more processors to perform a method for adaptively switching supervised detection strategy for watermarked and non-watermarked real time televised video advertisements. The televised video advertisements are present in a live stream of a media content of a broadcasted channel. The method includes a first step of selecting a set of frames per second from a pre-defined set of frames in each second of the live stream of the media content. The method includes another step of checking for one or more watermarked features in each selected frame of the set of frames in the live stream of the media content. Further, the method includes yet another step of switching to a first detection strategy. The first detection strategy is associated with detection of a first ad in the live stream of the media content when the one or more watermarked feature are present in each checked frame in the selected set of frames. The first detection strategy includes a first step of extracting a pre-defined number of keypoints from each selected frame of the media content. The pre-defined number of key points is extracted based on validation of at least one of scale invariance criterion, a rotation invariance criterion and a Harris score criterion. The first detection strategy includes another step of deriving a pre-defined number of binary descriptors from the pre-defined number of extracted keypoints. Each binary descriptor is characterized by a binary string with a length of 256 bits. The first detection strategy includes yet another step of assigning a weight value to each binary descriptor of the pre-defined number of binary descriptors. The weight value for each binary descriptor is 1 normalized and each normalized weight value for each binary descriptor is characterized by an arithmetic sum of 1. The first detection strategy includes yet another step of creating a special pyramid of the pre-defined number of binary descriptors to obtain a pre-defined number of spatially identifiable binary descriptors. The special pyramid is created to obtain a first vocabulary of binary descriptors of each selected frame. The first detection strategy includes yet another step of accessing a second vocabulary of binary descriptors for a curated comprehensive repository of ad frames. The curated repository of the ad frames corresponds to a comprehensive set of televised advertisements. The second vocabulary includes a set of tree structured clusters of binary descriptors. The first detection strategy includes yet another step of comparing each spatially identifiable binary descriptor in the first vocabulary with spatially identifiable binary descriptors in the second vocabulary. The first detection strategy includes yet another step of progressively scoring each selected frame from the live stream of media content for validation of the selected frame as the ad frame of the first ad. The first ad is progressively scored for each positively validated frame to obtain a progressive ad score. Moreover, the first detection strategy includes yet another step of detecting the first ad in the live stream of the media content when the progressive score for the first ad is above a threshold score.

In yet another, the present disclosure provides a computer-readable storage medium. The computer-readable storage medium encodes computer executable instructions to perform a method for adaptively switching supervised detection strategy for watermarked and non-watermarked real time televised video advertisements. The televised video advertisements are present in a live stream of a media content of a broadcasted channel. The method includes a first step of selecting a set of frames per second from a pre-defined set of frames in each second of the live stream of the media content. The method includes another step of checking for one or more watermarked features in each selected frame of the set of frames in the live stream of the media content. Further, the method includes yet another step of switching to a first detection strategy. The first detection strategy is associated with detection of a first ad in the live stream of the media content when the one or more watermarked feature are present in each checked frame in the selected set of frames. The first detection strategy includes a first step of extracting a pre-defined number of keypoints from each selected frame of the media content. The pre-defined number of key points is extracted based on validation of at least one of scale invariance criterion, a rotation invariance criterion and a Harris score criterion. The first detection strategy includes another step of deriving a pre-defined number of binary descriptors from the pre-defined number of extracted keypoints. Each binary descriptor is characterized by a binary string with a length of 256 bits. The first detection strategy includes yet another step of assigning a weight value to each binary descriptor of the pre-defined number of binary descriptors. The weight value for each binary descriptor is L1 normalized and each normalized weight value for each binary descriptor is characterized by an arithmetic sum of 1. The first detection strategy includes yet another step of creating a special pyramid of the pre-defined number of binary descriptors to obtain a pre-defined number of spatially identifiable binary descriptors. The special pyramid is created to obtain a first vocabulary of binary descriptors of each selected frame. The first detection strategy includes yet another step of accessing a second vocabulary of binary descriptors for a curated comprehensive repository of ad frames. The curated repository of the ad frames corresponds to a comprehensive set of televised advertisements. The second vocabulary includes a set of tree structured clusters of binary descriptors. The first detection strategy includes yet another step of comparing each spatially identifiable binary descriptor in the first vocabulary with spatially identifiable binary descriptors in the second vocabulary. The first detection strategy includes yet another step of progressively scoring each selected frame from the live stream of media content for validation of the selected frame as the ad frame of the first ad. The first ad is progressively scored for each positively validated frame to obtain a progressive ad score. Moreover, the first detection strategy includes yet another step of detecting the first ad in the live stream of the media content when the progressive score for the first ad is above a threshold score.

BRIEF DESCRIPTION OF THE FIGURES

Figure 1A:
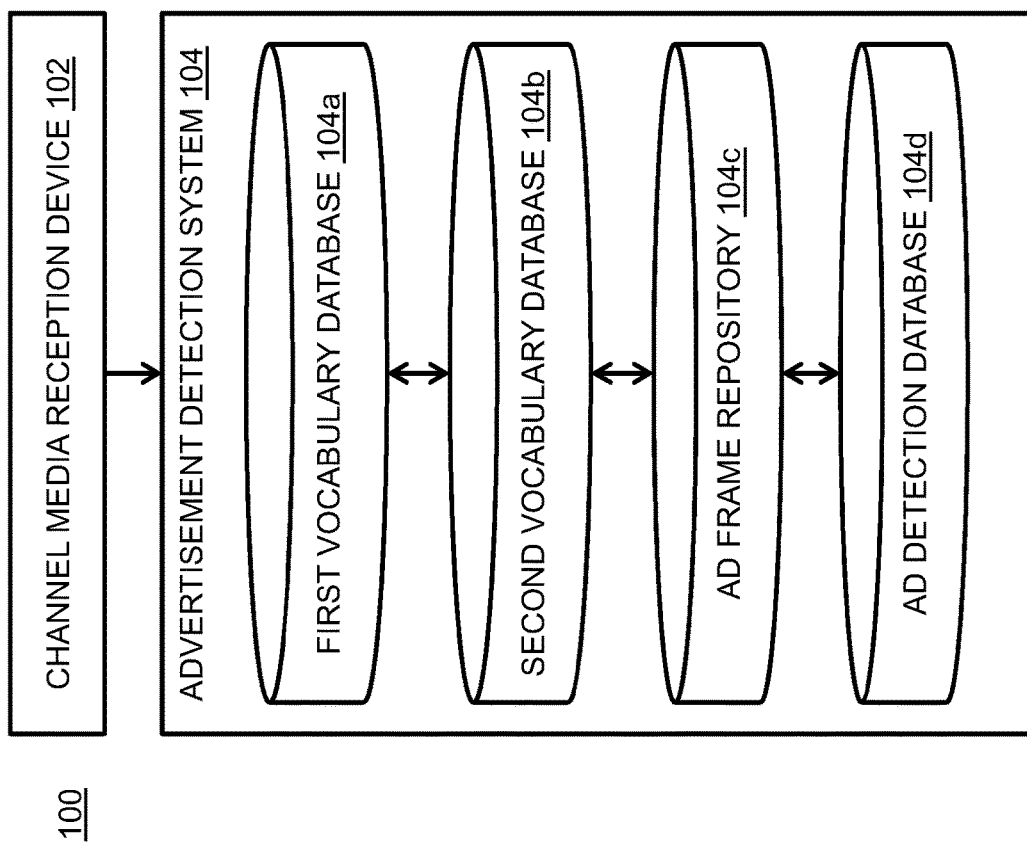
Figure 1B:
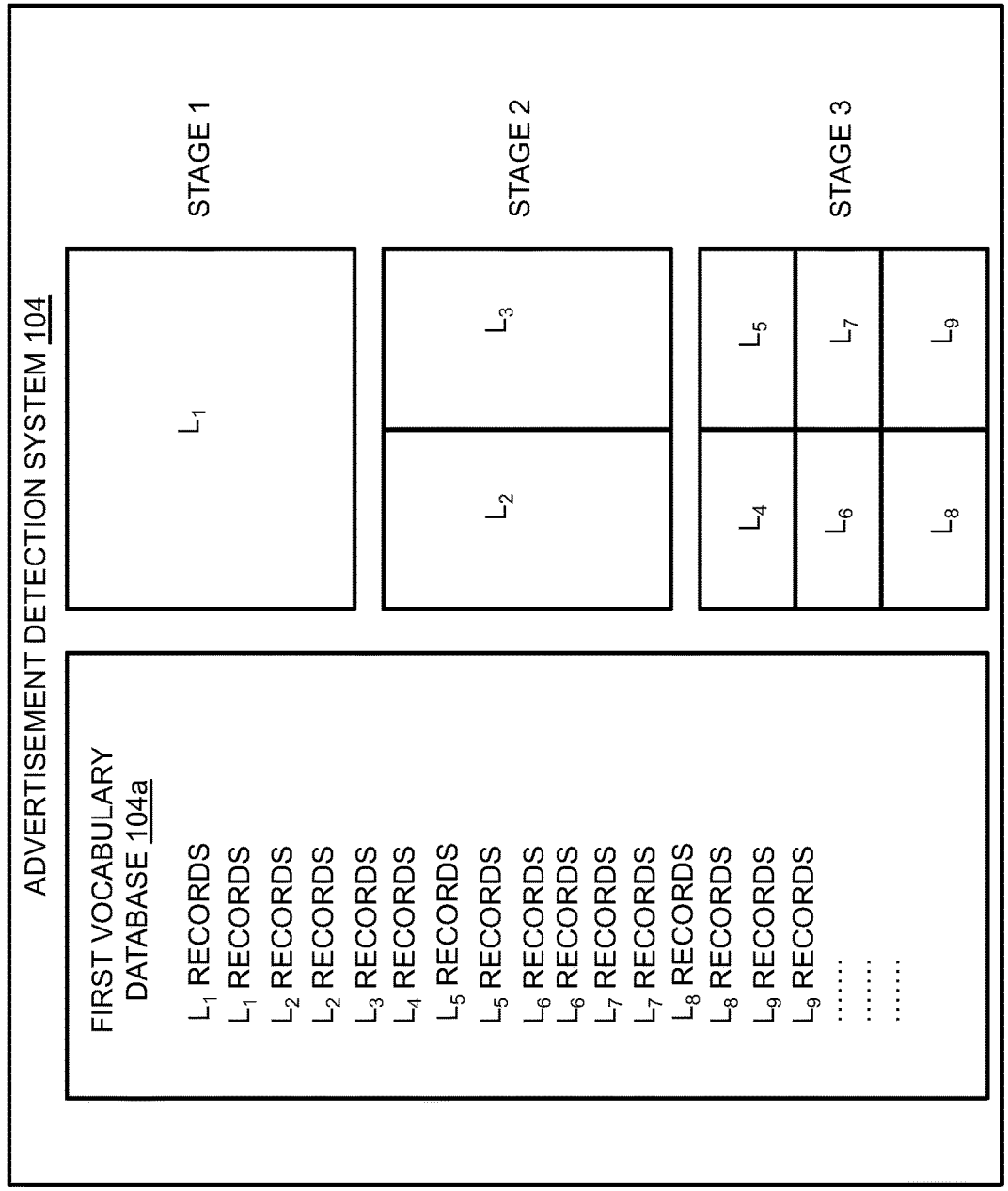
Figure 1C:
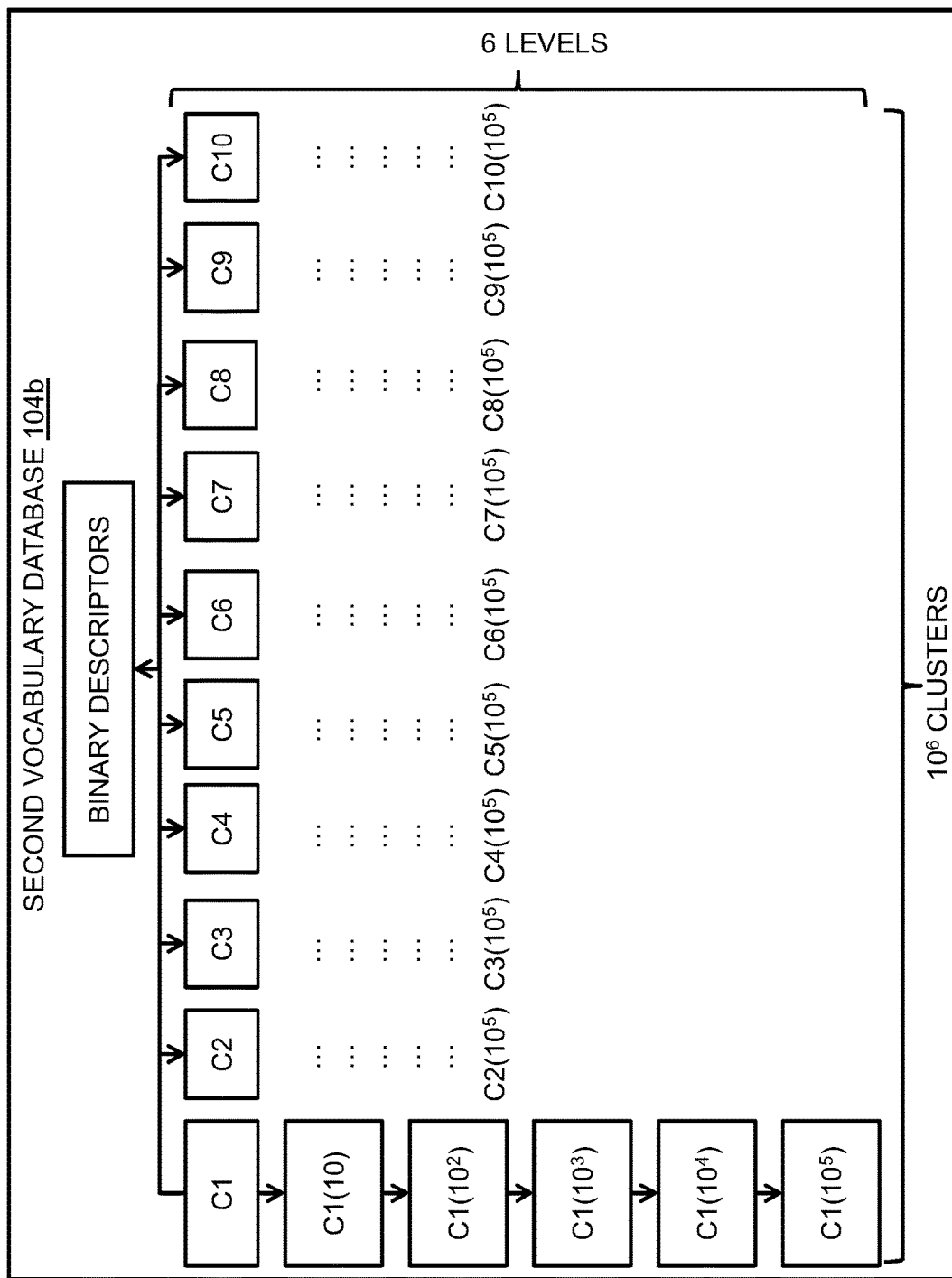
Figure 1D:
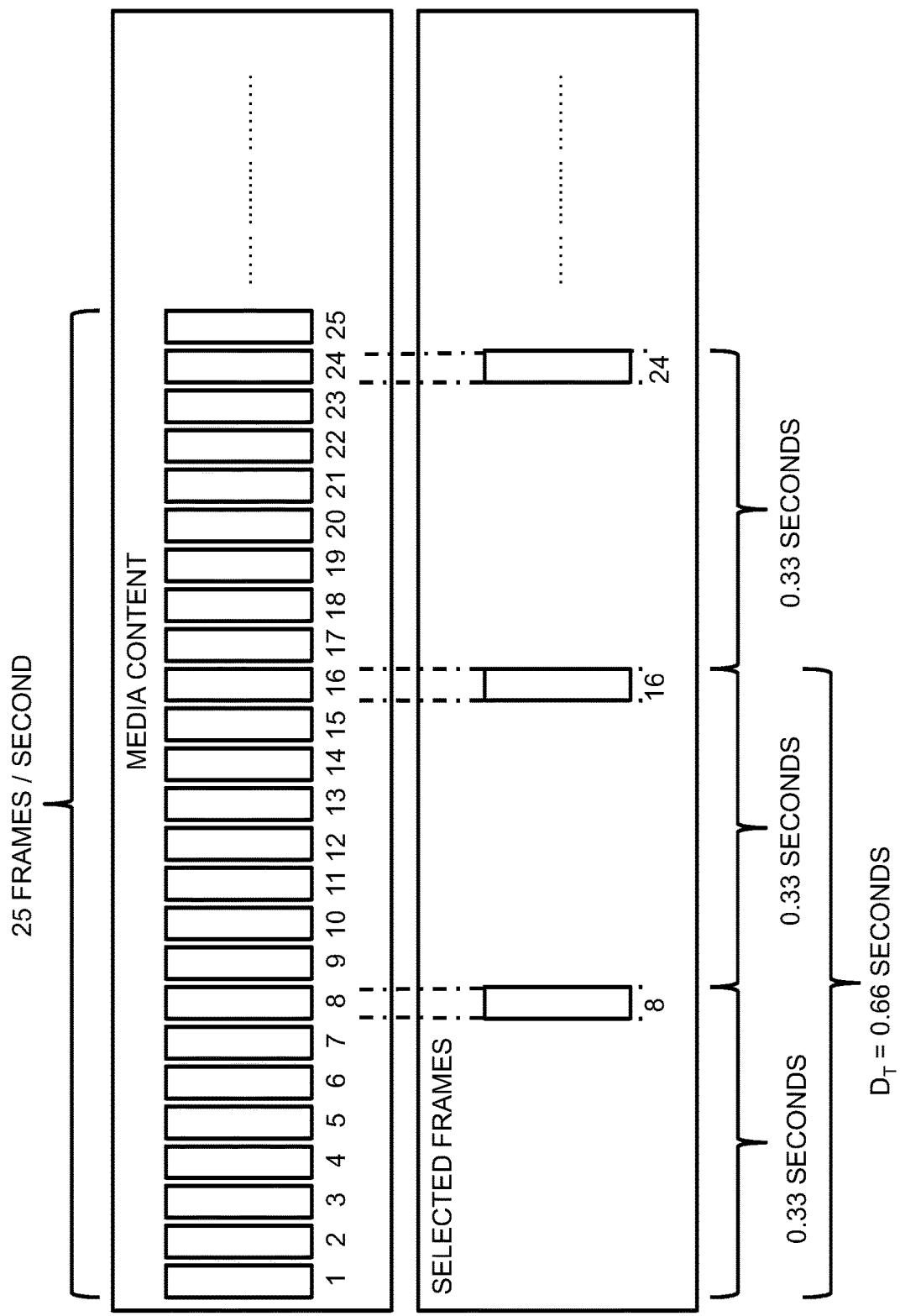
Figure 2A:
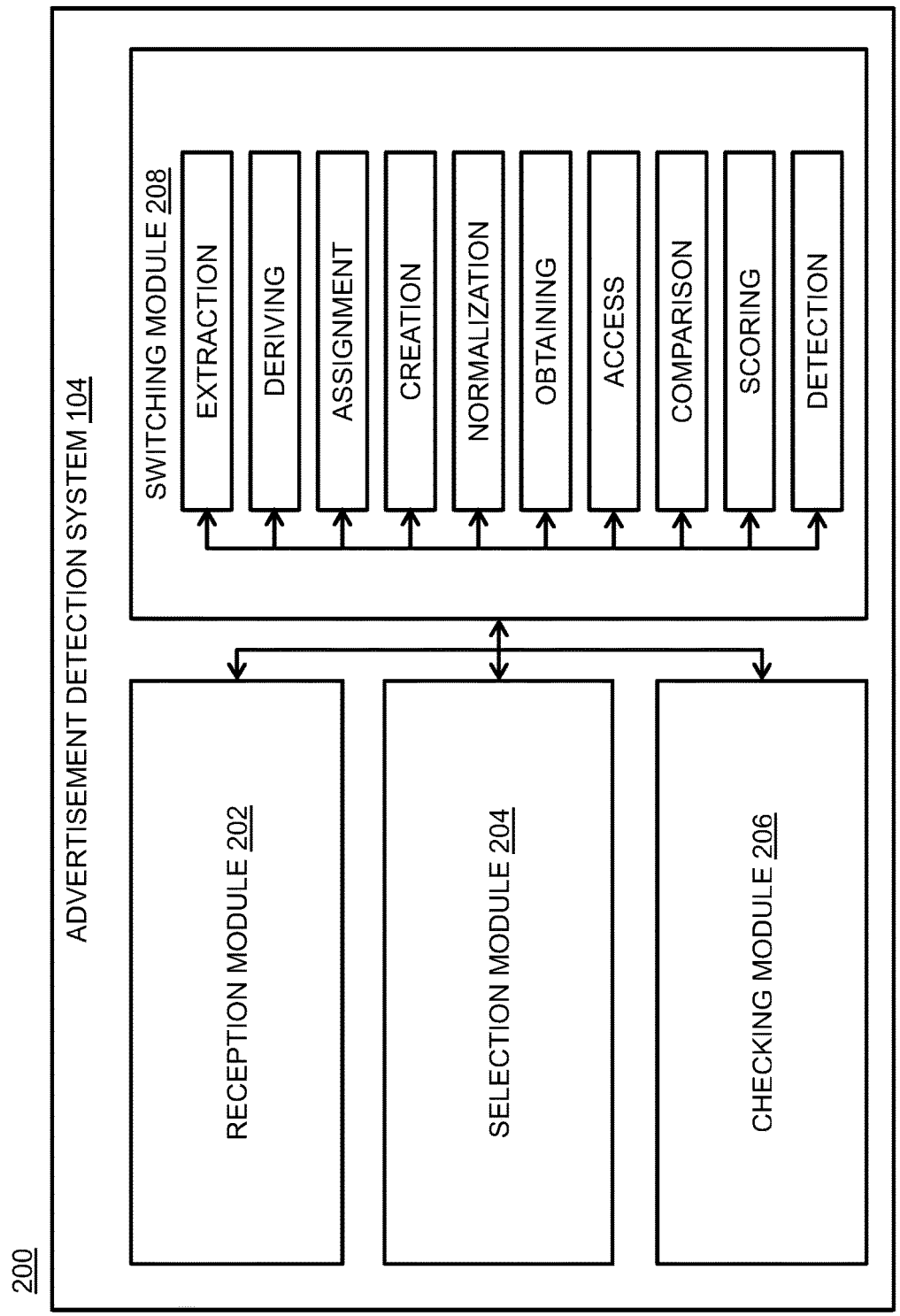
Figure 2B:
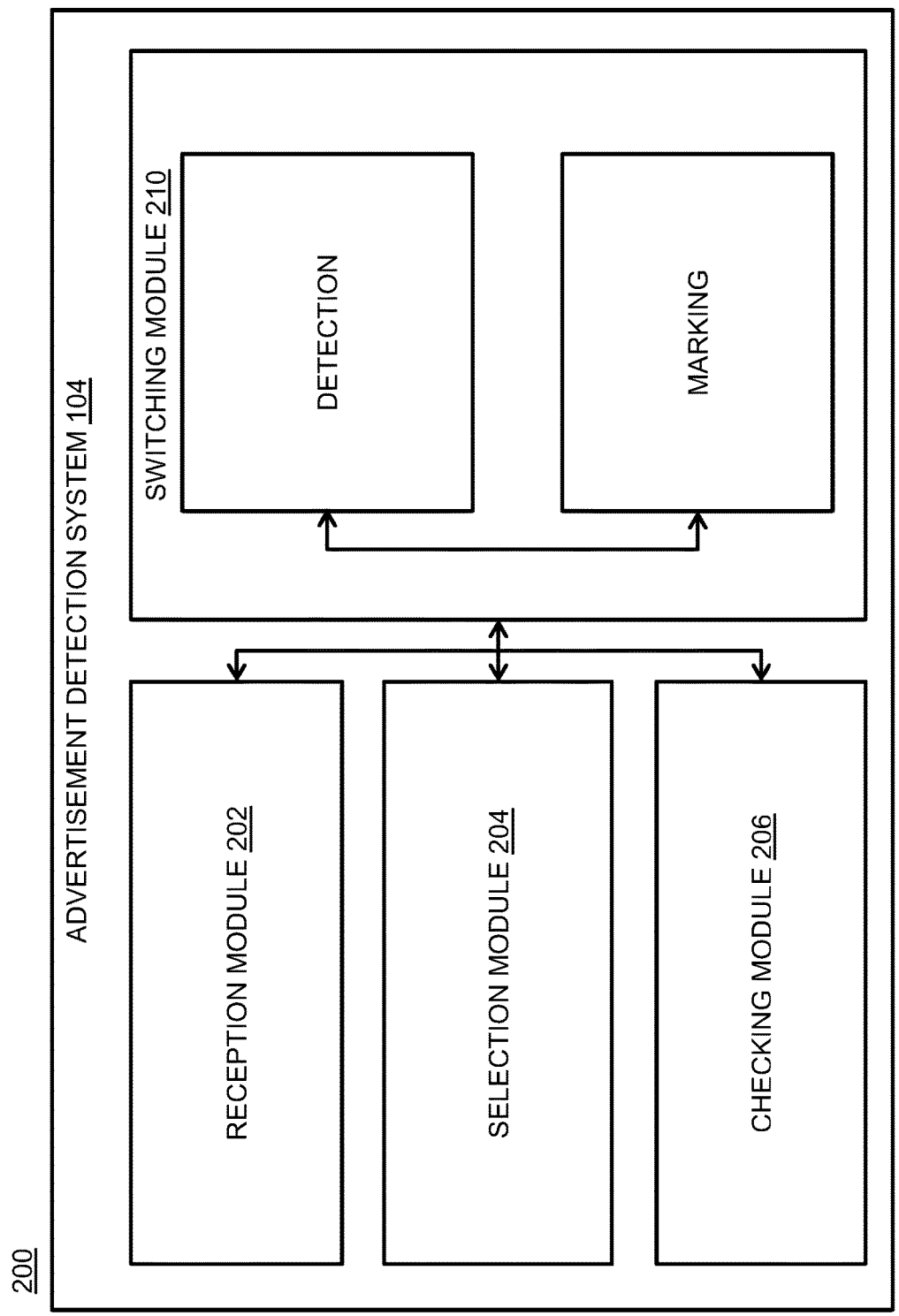
Figure 3:
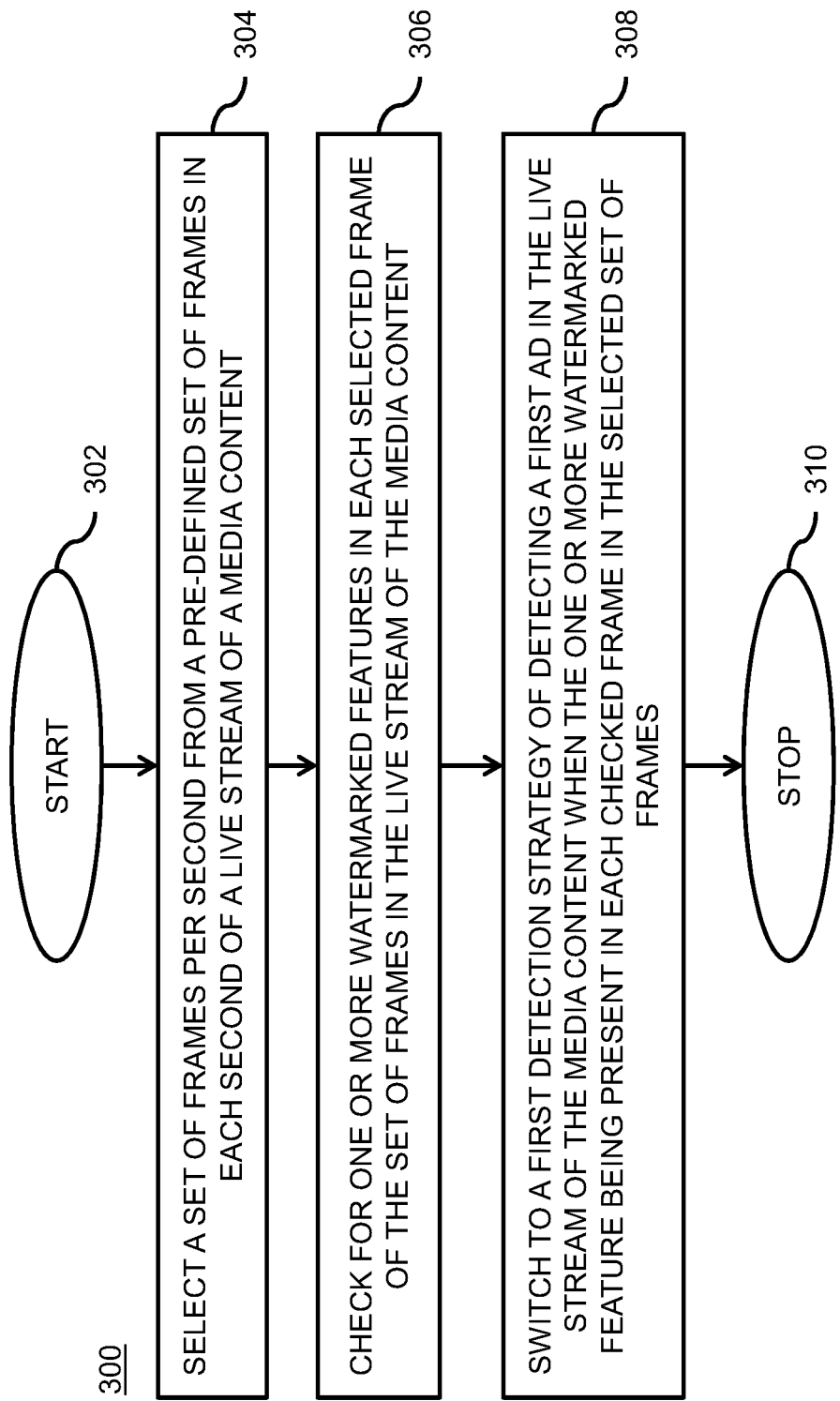
Figure 4:
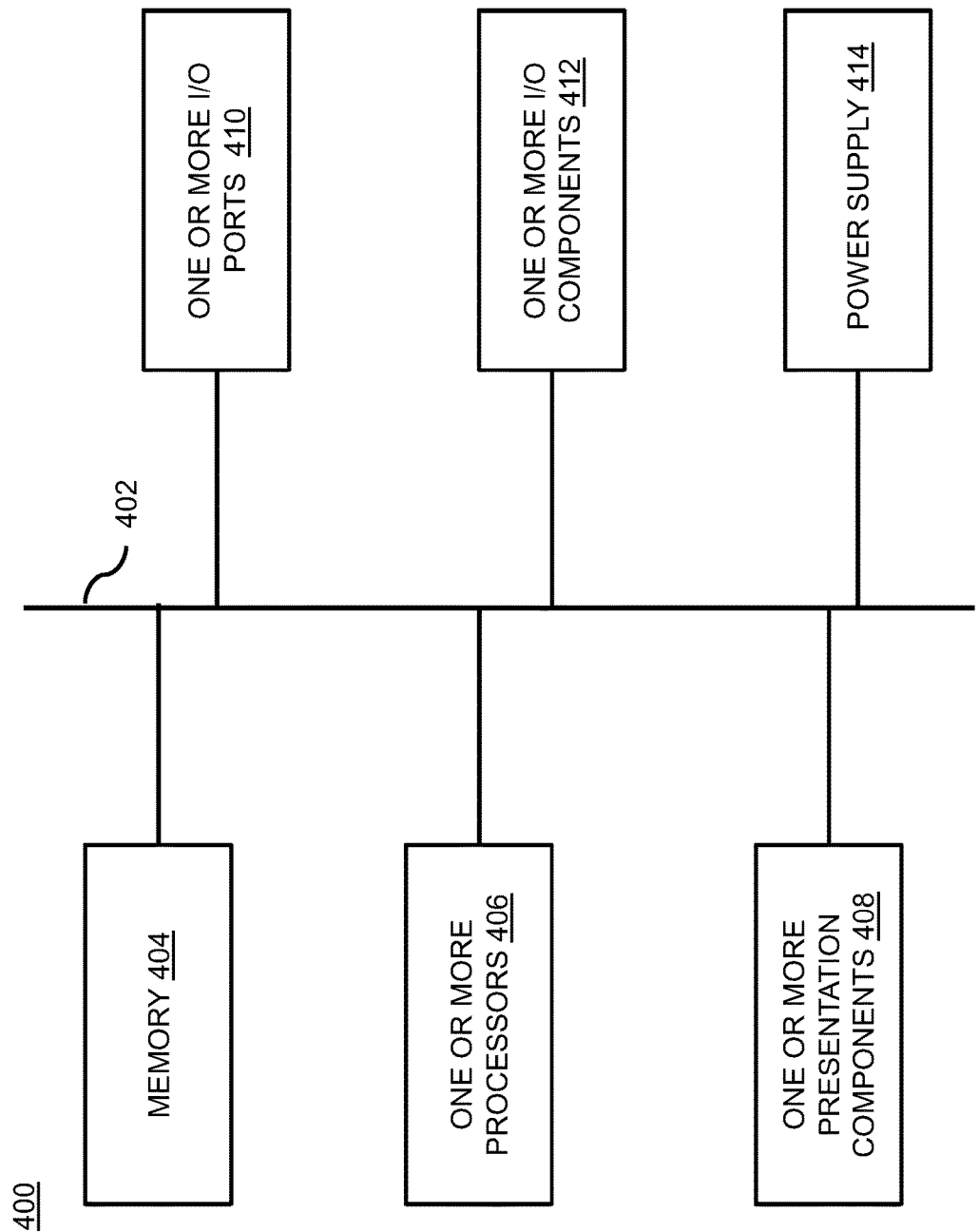

Having thus described the invention in general terms, reference will now be made to the accompanying drawings, which are not necessarily drawn to scale, and wherein:

FIG. 1A illustrates a system for adaptively switching supervised detection strategy for watermarked and non-watermarked real time televised video advertisements in a live stream of a media content of a broadcasted channel, in accordance with various embodiments of the present disclosure;

FIG. 1B illustrates an example of creating special pyramid for a selected frame of the media content;

FIG. 1C illustrates an example of clustering binary descriptors into million clusters;

FIG. 1D illustrates an example of frame selections from the media content for detecting ads and detection time thereof;

FIG. 2A illustrates a block diagram of an advertisement detection system, in accordance with an embodiment of the present disclosure;

FIG. 2B illustrates a block diagram of an advertisement detection system, in accordance with another embodiment of the present disclosure;

FIG. 3 illustrates a flow chart for adaptively switching supervised detection strategy for watermarked and non-watermarked real time televised video advertisements, in accordance with various embodiments of the present disclosure; and FIG. 4 illustrates a block diagram of a portable communication device, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

FIG. 1A illustrates a system 100 for adaptively switching supervised detection strategy for watermarked and non-watermarked real time televised video advertisements in a live stream of a media content of a broadcasted channel, in accordance with various embodiments of the present disclosure. The adaptive switching to different supervised detection strategies is associated with sudden disappearance of digitally watermarked features from frames of the media content. The sudden disappearance of the digitally watermarked features corresponds to airing of televised advertisements in the live stream of the media content. The system 100 may adaptively perform the check for sudden disappearance of the watermarked features to save computing time and resources against other computationally heavier detection strategies. Moreover, the real time detection of televised video advertisements is significantly interrelated to the detection time for positive validation of airing content as the televised video ad. The system 100 implements sophisticated statistical learning and mature computer vision techniques on video frames of the media content. The use of efficiently structured database management, feature extraction and analysis provides robust and non-redundant detection of televised video ads in the live stream of the media content. Moreover, the system 100 describes a network and computational infrastructure for coherent, concurrent and non-redundant reception, statistical analysis, recognition and supervised detection of televised ads in televised media content for a television channel. The implementation of computer vision, feature extraction and statistical learning techniques on real time collected and pre-processed statistical models of advertisement videos facilitates the supervised detection of televised video advertisements. The media content in the live stream of the channel is selectively processed in units of frames and robust statistical learning models are developed over the selectively processed frames of the media content. The robust statistical learning models are parametrically analyzed and prominent and prospective features are classified and compared for an improvement in time and error rate of detection of the televised video ads. The detection time is significantly reduced and ad analytics can be synchronized with social media or television ad campaigns.

The system 100 includes a channel media reception device 102 and an advertisement detection system 104. The above stated elements of the system 100 operate coherently and synchronously to detect televised ads in the media content of the channel. The channel media reception device 102 is a device for reception, authentication, decoding of the live stream of encoded media content in the form of channel feed of the channel. The channel media reception device 102 is attached directly or indirectly to a receiving antenna or dish. The receiving antenna receives a broadcasted signal carrying one or more channel feeds. The one or more channel feeds are encoded in a pre-defined format. In addition, the one or more channel feeds have a set of characteristics. The set of characteristics include but may not be limited to a frame rate, an audio sample rate, encoding scheme, transcoding scheme, bit rate and channel frequency band.

The broadcasted signal carrying the one or more channel feeds is initially transmitted from a transmission device. In an embodiment of the present disclosure, the broadcasted signal carrying the one or more channel feeds is a multiplexed MPEG-2 encoded signal having a constant bit rate. In another embodiment of the present disclosure, the broadcasted signal carrying the one or more channel feeds is a multiplexed MPEG-2 encoded signal having a variable bit rate. In yet another embodiment of the present disclosure, the broadcasted signal carrying the one or more channel feeds is any digital standard encoded signal. The bit rate is based on complexity of each frame in each of the one or more channel feeds. The quality of the multiplexed MPEG-2 encoded signal will be reduced when the broadcasted signal is too complex to be coded at a constant bit-rate. The bit rate of the variable bit-rate MPEG-2 streams is adjusted dynamically as less bandwidth is needed to encode the images with a given picture quality. In addition, the broadcasted signal is encrypted for a conditional access to a particular subscriber. The encrypted broadcast signal is uniquely decoded by the channel media reception device 102 uniquely.

In an example, a digital TV signal is received on the channel media reception device 102 as a stream of MPEG-2 data. The MPEG-2 data has a transport stream. The transport stream has a data rate of 40 megabits/second for a cable or satellite network. Each transport stream consists of a set of sub-streams. The set of sub-streams is defined as elementary streams. Each elementary stream includes an MPEG-2 encoded audio, an MPEG-2 encoded video and data encapsulated in an MPEG-2 stream. Moreover, each elementary stream includes a packet identifier (hereinafter "PID") that acts as a unique identifier for corresponding elementary stream within the transport stream. The elementary streams are split into packets in order to obtain a packetized elementary stream (hereinafter "PES").

In an embodiment of the present disclosure, the channel media reception device 102 is a digital set top box. In another embodiment of the present disclosure, the channel media reception device 102 is a hybrid set top box. In yet another embodiment of the present disclosure, the channel media reception device 102 is any standard broadcast signal processing device. Further, the channel media reception device 102 may receive the broadcast signal from any broadcast signal medium. In an embodiment of the present disclosure, the broadcast signal medium is an Ethernet cable. In another embodiment of the present disclosure, the broadcast signal medium is a satellite dish. In yet another embodiment of the present disclosure, the broadcast signal medium is a coaxial cable. In yet another embodiment of the present disclosure, the broadcast signal medium is a telephone line having DSL connection. In yet another embodiment of the present disclosure, the broadcast signal medium is a broadband over power line (hereinafter "BPL"). In yet another embodiment of the present disclosure, the broadcast signal medium is wireless ordinary VHF or UHF bandwidth.

The channel media reception device 102 primarily includes a signal input port, an audio output port, a video output port, a de-multiplexer, a video decoder, an audio decoder and a graphics engine. The broadcast signal carrying the one or more channel feeds is received at the signal input port. The broadcast signal carrying the one or more channel feeds is de-multiplexed by the de-multiplexer. The video decoder decodes the encoded video and the audio decoder decodes the encoded audio. The video and audio corresponds to a channel selected in the channel media reception device 102. In general, the channel media reception device 102 carries the one or more channel feeds multiplexed to form a single transporting stream.

The decoded audio and the decoded video are received at the audio output port and the video output port. The decoded video is characterized by a set of features. The set of features include but may not be limited to a frame height, a frame width, a frame rate, a video resolution, a bit rate and an encoding scheme. Further, the decoded video may be of any display resolution. Examples of the display resolution include but may not be limited to 144 p, 240 p, 360 p, 480 p, 720 p, 1080 p and 1080 i. Here, p and i denotes progressive scan and interlace scan techniques.

The decoded video is transferred to the advertisement detection system 104 through a transfer medium. The transfer medium can be a wireless medium or a wired medium. The decoded video corresponds to the live stream of media content for the broadcasted channel. The live stream of the media content includes an ad stream and a non-ad stream. The ad stream includes one or more ads. The non-ad stream may correspond to televised published content, channel related data, subscription related data, operator messages and the like.

The media content is characterized by a pre-defined frame rate, a pre-defined number of frames and a pre-defined bit rate for a pre-defined interval of broadcast. The pre-defined frame rate is defined as a pre-defined set of frames streamed per second in the live stream of the media content. The pre-defined set of frames per second is often referred as frame per second (FPS). Examples of the pre-defined set of frames per second include but may not be limited to 25 FPS, 30 FPS, 20 FPS and 35 FPS.

The advertisement detection system 104 selects a set of frames per second from the pre-defined set of frames in each second of the live stream of the media content. Each selected frame in the selected set of frames differs by a frame gap of at least 8 frames. In an embodiment of the present disclosure, the selected set of frames per second from the pre-defined set of frames is 3 per second. In another embodiment of the present disclosure, the selected set of frames per second from the pre-defined set of frames is more or less than 3 per second. For example, the advertisement detection system 104 may be configured to select every $8^{th}$ frame from 25 frames per second of the media content. The pre-defined set of frames may be every $8^{th}$, $16^{th}$ and $24^{th}$ frame per 25 frames in each second of the media content.

The advertisement detection system 104 performs histogram normalization on each selected frame from the selected set of frames per second of the media content broadcasted on the broadcasted channel. The advertisement detection system 104 sets each pixel value in each frame of the media content to a standard pixel value range set. Further, the advertisement detection system 104 scales each frame of the media content to a pre-defined scale. In an embodiment of the present disclosure, the pre-defined scale of each frame is 640 by 480. Each selected frame of the set of selected frame per second is characterized by a pre-defined number of pixels. Each pixel is fundamentally a combination of Red. Green and Blue colors hereinafter "RGB"). Each color of the pixel (RGB) has the pre-defined value in a range of 0-255 The advertisement detection system 104 gray-scales each selected frame of the selected set of frames. The advertisement detection system 104 checks for one or more watermarked features in each selected frame of the set of frames in the live stream of the media content. The one or more watermarked features in the selected frame include at least one of a channel logo, a content logo, a content certificate and an ad certificate.

For example, the media content of a channel is digitally watermarked with the channel logo or content logo till the non-ad content is aired on the channel. The digital watermarks like the channel logo or the content logo disappears when the televised advertisements are aired. The sudden disappearance may denote the occurrence of the televised advertisements. The advertisement detection system 104 may progressively monitor a position, a shape, colors, a size and a brightness level of the one or more watermarked features in each selected frame of the media content. Moreover, the advertisement detection system 104 may monitor one or more characters and one or more curves in the one or more watermarked features of the selected frame of the media content.

The advertisement detection system 104 may monitor the one or more watermarked features in parlance of any prominent event. Examples of the prominent event include but may not be limited to a transition of a scheduled program to a televised advertisement and a transition from the televised advertisement to the scheduled program. For example, a TV show X is currently playing on a channel Y and a logo L of the channel Y appears on a top right corner of the screen when the TV show X is playing. The logo L has a blue color, a fixed size, a fixed shape and a fixed brightness level. The TV show goes for a commercial break after some time and the logo L disappears from the top right corner. The logo L appears back after the commercial break is over and the scheduled program is aired.

The advertisement detection system 104 is configured to adopt a first detection strategy for a first scenario and a second detection strategy for a second scenario. The advertisement detection system 104 switches to the first detection strategy in the first scenario when the one or more watermarked feature are present in each checked frame in the selected set of frames. The first scenario pertains to a permanence of the one or more watermarked features throughout the airing schedule of the scheduled programs and the televised advertisements in the live stream of the media content.

The first detection strategy is computationally resource absorbing and requires the application of sophisticated database management, computer vision and machine learning techniques. The first detection strategy includes extraction of a pre-defined number of keypoints from each selected frame of the selected set of frames per second of the media content. The pre-defined number of key points is extracted from the pre-defined number of frames by the advertisement detection system 104. Each extracted keypoint is characterized by a spatial position in each selected frame. In general, each keypoint in any gray-scaled frame corresponds to a pixel with enough neighborhood pixels in a different gray area with the pixel. Each keypoint is generally selected by choosing an arbitrary pixel point as center to form a circular area and assigning the circular area as the pixel point's neighborhood. The circular area of the selected keypoint is analyzed for satisfying the condition:

$$|I_X - I_P| > I_T$$

Where $I_X$ is the intensity of gray-scaled neighborhood pixels and $I_P$ is the intensity of a selected feature pixel.

The advertisement detection system 104 uses Harris detector to select the pre-defined number of keypoints and sorts the selected pre-defined set of keypoints. The pre-defined number of keypoints is extracted based on validation of at least one of scale invariance criterion, rotation invariance criterion, Harris score criterion and translational invariance criterion. The extracted pre-defined number of keypoints is invariant to at least one of rotation, translation and scaling of object in selected frame in the set of frames of the media content. In an exemplary embodiment of the present disclosure, the pre-defined number of keypoints for each selected frame in the selected set of frames is 700. In another embodiment of the present disclosure, the pre-defined number of keypoints for each selected frame in the selected set of frames is more than 700. In yet another embodiment of the present disclosure, the pre-defined number of keypoints for each selected frame in the selected set of frames is less than 700. The number of selections depends on a scale of detection and limited computational capacity of the advertisement detection system 104.

The advertisement detection system 104 calculates direction in corners of each keypoint. The directions in the form of intensity vectors are calculated using uses intensity centroid technique. The advertisement detection system 104 derives a pre-defined number of binary descriptors from the pre-defined number of extracted keypoints. Each binary descriptor is characterized by a binary string with a length of 256 bits. Each 256 bit of binary descriptor uniquely identifies a feature point in the selected frame of the media content. Each binary descriptor is derived after adaptive implementation of rotational, translational and scale invariance techniques. The number of binary descriptors depends on the number of extracted keypoints. In an exemplary embodiment of the present disclosure, the pre-defined number of binary descriptors is 700. In another embodiment of the present disclosure, the pre-defined number of binary descriptors is more than 700. In yet another embodiment of the present disclosure, the pre-defined number of binary descriptors is less than 700.

The advertisement detection system 104 is a computing server with provisions for volatile memory as random access memory (RAM) and permanent non-volatile storage spaces. The advertisement detection system 104 maintains one or more databases in the volatile memory and permanent non-volatile storage space. The one or more databases in the advertisement detection system 104 includes a first vocabulary database 104a, a second vocabulary database 104b, an ad frame repository 104c and an ad detection database 104d. The advertisement detection system 104 uses the one or more databases for storing the descriptor data and other statistical and detection data.

The advertisement detection system 104 stores the derived descriptor data in the first vocabulary database 104a. The advertisement detection system 104 assigns a weight value to each binary descriptor of the pre-defined number of binary descriptors in the first vocabulary database 104a. The assignment of the weight values to the binary descriptors is based on a term frequency and an inverse document frequency of the descriptors in the first vocabulary database 104a. For example, the weight value for a binary descriptor (B) with a higher term frequency will be less than the weight value for a binary descriptor (C) with a lower term frequency. The weight values of the binary descriptors are L1 normalized to lie in a range of 0 and 1. The normalized weight values for the binary descriptors are characterized by an arithmetic sum of 1.

Mathematically, if $W_i$ denotes the weight values of N descriptors, then the L1 normalization of the Wi weights is defines as:

$$W_i(\text{Normalized}) = W_i / W_{Norm}$$

Where $$W_{Norm} = \sum_{N=1}^{N} W_i$$

The normalization of the weight values of the pre-defined number of the binary descriptor is performed to simplify calculation parameters and reduce statistical dissimilarities in weight values. For example, an assigned weight value $W_1$ is 30 for a specific term frequency and another weight value $W_2$ is 150 for another term frequency. The L1 normalization of $W_1$ and $W_2$ will be 30/(30+150) and 150/(30+150), i.e. 0.167 and 0.833 respectively. The L1 normalized weights of the pre-defined number of binary descriptors are stored in the first vocabulary database 104a of the advertisement detection system 104.

The spatial information of the extracted keypoint and the binary descriptor is lost with the derivation of the binary descriptors for the extracted keypoints from each selected frame of the media content. The spatial information is revalidated and identified by creating a special pyramid of binary descriptors (as shown in FIG. 1B). The advertisement detection system 104 creates the special pyramid of the pre-defined number of derived binary descriptors to obtain a pre-defined number of spatially identifiable binary descriptors. The special pyramid is a database of binary descriptors with three stages of each selected frame. The three stages are labeled for illustration in FIG. 1B. The three stages are stage 1, stage 2 and stage 3 respectively. The three stages are segregated into nine discrete levels for the same selected frame. The nine discrete levels are labeled in FIG. 1B as $L_1$, $L_2$, $L_3$, $L_4$, $L_5$, $L_6$, $L_7$, $L_8$ and $L_9$ respectively. Each level segregates the keypoints and descriptors according to a specific sliced region in the selected frame. The first stage includes the entire selected frame and the binary descriptors as sparsely distributed over the entire frame in the first level ($L_1$). The spatial information is uncertain in $L_1$. The second stage includes a second level ($L_2$) and a third level ($L_3$) of the binary descriptors as slices of the selected frame into two equal rectangular halves. The second level ($L_2$) maps to a first fraction of the binary descriptors and the third level ($L_3$) maps to remaining binary descriptors. The third stage includes six levels ($L_4$, $L_5$, $L_6$, $L_7$, $L_8$ and $L_9$) of the binary descriptors. The six levels ($L_4$, $L_5$, $L_6$, $L_7$, $L_8$ and $L_9$) are distributed over six slices of the selected frame. Each slice maps a specific fraction of the binary descriptors. Each binary descriptor can be mapped spatially in each stage and subsequent level of the special pyramid. The third stage is most significant for spatially identifying each binary descriptor in the pre-defined number of the binary descriptors. The number of spatially identifiable binary descriptors is thrice the number of the binary descriptors for each selected frame. In an embodiment of the present disclosure, the pre-defined number of spatially identifiable binary descriptors is 2100 when the pre-defined number of binary descriptors is 700. The pre-defined number of spatially identifiable binary descriptors are updated, sorted and stored as records in the first vocabulary database 104a (as shown in FIG. 1B). Also, each spatially identifiable binary descriptor is tagged with a level identifier in the first vocabulary database 104a. Each weight value for each binary descriptor in the special pyramid of the pre-defined number of spatially identifiable binary descriptors is again L1 normalized. Each weight value in the special pyramid is L1 normalized such that the arithmetic sum of the weight values is 1. The advertisement detection system 104 finally obtains a first vocabulary of binary descriptors for the pre-defined number of spatially identifiable binary descriptors of each selected frame in the first vocabulary database 104a.

The detection of the ad in the live stream of the media content is based on implementation of supervised detection techniques. The advertisement detection system 104 accesses a second vocabulary of binary descriptors in the second vocabulary database 104b. The second vocabulary of binary descriptors corresponds to a curated comprehensive repository of ad frames from a comprehensive set of televised advertisements. The curated comprehensive repository of ad frames from the comprehensive set of televised advertisements is stored in the ad frame repository 104c of the advertisement detection system 104. The second vocabulary of the binary descriptors is created prior to real time detection of the live stream of the media content. The second vocabulary of binary descriptors is elementally stored in the second vocabulary database 104b as spatially identifiable records with tagged levels of the special pyramid and normalized weight values. The advertisement detection system 104 creates the second vocabulary of binary descriptors from the comprehensive repository of ad frames. The advertisement detection system 104 extracts the pre-defined number of keypoints and the pre-defined number of binary descriptors from each frame in the repository of ad frames. The advertisement detection system 104 creates the special pyramid of the binary descriptors for each ad frame to obtain the pre-defined number of spatially identifiable binary descriptors.

The advertisement detection system 104 clusters the binary descriptors into a first set of clusters (as shown in FIG. 1C). The binary descriptors are clustered into the first set of clusters. The first set of clusters is created based on an evaluation of minimum hamming distance between each binary descriptor in the pre-defined number of spatially identifiable binary descriptors. Each cluster in the first set of clusters is associated with a centroid. The centroid of each cluster is a middle of each cluster. The centroid is a vector which includes a number for each variable in each cluster of the first set of clusters. Each number is a mean of the variables in each cluster of the first set of clusters. Each centroid is measure of location of each cluster in the set of clusters. In an embodiment of the present disclosure, the first set of clusters includes 10 centroids associated with 10 clusters (C1-C10). In another embodiment of the present disclosure, the first set of clusters includes more or less than 10 centroids associated with more or less than 10 clusters. Each cluster in the first set of clusters includes a fraction of the pre-defined number of spatially identifiable binary descriptors. Further, the advertisement detection system 104 iteratively clusters the binary descriptors in each cluster of the first set of clusters and each subsequent cluster for a pre-determined iteration level to obtain a set of tree structured clusters. The pre-determined iteration level for iteratively clustering the derived binary descriptors obtained from the repository of ad frames is 6 (as shown in FIG. 1C). Each cluster in the set of tree structured clusters is associated with a centroid. In an embodiment of the present disclosure, the set of tree structured clusters includes $10^6$ centroids in association with $10^6$ clusters (C1 ($10^5$)-C 10($10^5$)) when the pre-determined iteration level is 6. Each binary descriptor in each cluster of the set of tree structured clusters is optimally clustered for a lowest hamming distance among the fraction of the binary descriptors.

The advertisement detection system 104 assigns the weight value to each clustered binary descriptor in the set of tree structured clusters. Each weight value is evaluated based on optimal adjustment of the term frequency and the inverse document frequency. Further, each weight value is L1 normalized such that the evaluated arithmetic sum of weight values is 1. The binary descriptors and associated L1 normalized weight values in the set of tree structured clusters are optimally stored in a distributed chain of structured and sorted tables as a second vocabulary of binary descriptors. The second vocabulary of the binary descriptors is stored in the second vocabulary database 104b. Furthermore, the distributed chain of tables includes one or more descriptor tables and one or more look up tables. The one or more look up tables includes records pointing each clusters and associated descriptors in each clusters of the set of tree structured clusters. The second vocabulary includes the set of tree structured clusters of binary descriptors as leaf nodes. Each leaf node is associated with normalized weight values. The second vocabulary of the binary descriptors is characterized as an n-ary tree data structure with the leaf nodes.

In an exemplary example, a large collection of televised video advertisements, say 2000 are stored in the permanent non-volatile storage of the advertisement detection system 104. Considering each ad to have an average length of 15 seconds, the advertisement detection system 104 may create the comprehensive repository of ad frames from the 2000 ads. If each ad is run at 25 FPS for 15 seconds, then total number of frames for the ad will be 375 frames. The total number of frames for 2000 ads will be roughly 750000 frames for 25 FPS. Let us suppose that the advertisement detection system 104 extracts roughly 250000 prominent frames to create the comprehensive 250000 strong repository of ad frames.

Referring to the aforementioned example, the advertisement detection system 104 may extract, say 700 keypoints for each ad frame of the 250000 ad frames in the repository of ad frames. The total number of keypoints for 250000 ad frames is 175 million keypoints. The advertisement detection system 104 derives 175 million binary descriptors against the 175 million keypoints. The advertisement detection system 104 performs iterative clustering on the 175 million binary descriptors. In first iteration, the first set of clusters is obtained. Each set in the first set of clusters includes a fraction of 175 million descriptors. Let us assume that the $1^{st}$ cluster, $2^{nd}$ cluster, $3^{rd}$ cluster, $4^{th}$ cluster, $5^{th}$ cluster, $6^{th}$ cluster, $7^{th}$ cluster, $8^{th}$ cluster, $9^{th}$ cluster and $10^{th}$ cluster includes 20, 22, 30, 25, 23, 22, 8, 4, 12, 7 million binary descriptors respectively. Each cluster is obtained on the basis of minimum inter-binary descriptor hamming distance. Let us take six 8 bit binary numbers as an example for six 256 bit binary descriptors. The 8 bit descriptors are 01101010, 01011100 and 10101010 respectively. The hamming distance between the first descriptor and the second descriptor, the second descriptor and the third descriptor and the third and fourth descriptor is 4, 6 and 2. The advertisement detection system 104 segregates and clusters the binary descriptors with hamming distance of 4, 6 and 2 respectively.

In second iteration, each cluster in the first set of cluster is again clustered into 10 different clusters. The total number of clusters obtained after second iteration is $10^2$. In third iteration, each cluster in $10^2$ clusters is again clustered to obtain $10^3$ clusters. In fourth iteration and fifth iteration, each cluster in the $10^3$ and 104 clusters is again clustered. The iterative clustering is done till sixth iteration and a total of $10^6$ clusters are obtained. Each cluster containing approximately 1 million binary descriptors. $10^6$ clusters are stored and structured as the n-ary tree data structure with each cluster at each leaf node of the n-ary tree. The advertisement detection system 104 creates the special pyramid of the binary descriptors in the $10^6$ clusters for validating spatial information of the keypoints. The tree structured clusters are stored as the second vocabulary in the second vocabulary database 104b.

The advertisement detection system 104 compares each spatially identifiable binary descriptor in the first vocabulary of each selected frame with spatially identifiable binary descriptors in at least one or more clusters of the set of tree structured clusters. The set of tree structured clusters correspond to the second vocabulary of the binary descriptors of the repository of the ad frames. The advertisement detection system 104 searches for a cluster in the set of tree structured clusters that includes binary descriptors with minimum hamming distances with the binary descriptor in the first vocabulary of the selected frame in the live stream of the media content. Each binary descriptor from the first vocabulary of the binary descriptors for the selected frame of the media content is matched with the binary descriptor in the searched cluster for the minimum hamming distance. The binary descriptors are matched frame by frame. The advertisement detection system 104 calculates a Bhattacharya distance between weight values of each matched pair of the binary descriptors. The Bhattacharya distance is defined as square root of a product of a first weight value and a second weight value. The advertisement detection system 104 sums the calculated Bhattacharya distance for each matched descriptor in the first vocabulary of the binary descriptors for the selected frame of the media content to obtain a summed feature value. The summed feature values lies in a normalized range of 0 to 1.

If Wi is the weight value for an $i^{th}$ binary descriptor in the first vocabulary and Wj is the weight value of the jth binary descriptor in the set of tree structured clusters, then the feature value (Fv) is calculated as:

$$F_v = \sum_{i,j=1}^{N} (W_i * W_j)^{1/2}$$

Where i and j denote an index of the binary descriptor in the first vocabulary and the second vocabulary of binary descriptors respectively and N denotes the number of the binary $$D_{BH}(\text{Bhattacharya Distance}) = (W_i * W_j)^{1/2}$$

descriptors in the first vocabulary of the binary descriptors and where:

For example, let us assume that the 700 binary descriptors in the first vocabulary of the selected frame are matched with binary descriptors in one of the clusters of the second vocabulary of the binary descriptors. Each pair of matched descriptors in the first vocabulary of the binary descriptors and the second vocabulary of the binary descriptors is characterized by the weight values. The advertisement detection system 104 calculates the Bhattacharya distance between the weight values of the matched pair by taking the square root of the product of the weight values. The advertisement detection system 104 calculates the feature value (Fv) by summing the Bhattacharya distance between the matched pair of the binary descriptors. The summed feature value lies in a range of 0 to 1.

The advertisement detection system 104 progressively scores each selected frame from the live stream of media content for validation of the selected frame as ad frame of a first ad.

The detection of a first ad in the live stream of the media content is based on progressive evaluation of the summed feature values for each selected frame in the set of frames of the media content. Each selected frame for the first ad in the live stream of the media content is progressively scored in at least one or more steps. The ad may be positively evaluated at any of the steps in the one or more steps. The one or more steps include a first step of comparison test. The advertisement detection system 104 compares the summed feature value for each selected frame in the set of frames per second of the media content with a first threshold value in the comparison test. The summed feature value is compared for progressive validation of the selected frame as the ad frame. In an embodiment of the present disclosure, the first threshold value for validation of the selected frame as ad frame is 0.02. The advertisement detection system 104 evaluates a ratio test between selected frames in the selected set of frames of the media content. The ratio test is evaluated for determination of a degree of difference in consecutively selected frames in the set of frames per second of the media content. The ratio test is evaluated by dividing summed feature value for a second frame by corresponding summed feature value for a first frame in the selected set of frames. The advertisement detection system 104 rewards a first score for the first ad of the one or more ads in the live stream of the media content. The first ad is streamed in real time in the live stream of the media content. The first ad is rewarded by assigning a first ad score for the positive validation of the evaluated ratio. The first score is assigned to the first ad score when the evaluated ratio is less than a second threshold value. In an embodiment of the present disclosure, the first ad may be assigned a first ad score of 1.5 when the ratio of feature value for the second frame to that of the first frame is less than the second threshold value of 0.7. In another embodiment of the present disclosure, the first ad may be assigned a different first ad score when the ratio of feature value for the second frame to that of the first frame is less than a different second threshold value.

For example, a first frame (A) may have a feature value of 0.11 and a second frame (B) may have a feature value of 0.09. The ratio of the feature value for the second frame (B)

to that of the first frame (A) is 0.07/0.11 or 0.636. The ratio test evaluates to positive evaluation as the evaluated ratio is less than 0.7. The first ad is assigned a first ad score of 1.5 for the first frame.

The advertisement detection system 104 penalizes a second ad score for a second ad of the one or more ads of the media content by deducting a second score from the assigned first second ad score for the second ad. The second ad is a past ad streamed before the first ad. As the first ad is progressively detected in the live stream with progressive additions of score, the second ad is progressively devaluated with progressive deductions of the second score from the second ad score of the second ad. In an embodiment of the present disclosure, the second score as penalty to the second ad score of the second ad is 0.5. In another embodiment of the present disclosure, the second score as penalty to the second ad score of the second ad is more or less than 0.5.

The advertisement detection system 104 performs an equality test for consecutive frames in the selected set of frames of the media content. The equality test is based on equality criterion between the feature value of the first frame and the feature value of the second frame in the selected set of frames. The advertisement detection system 104 rewards the first ad score for the first ad of the one or more ads in the live stream of the media content with additions of a third score to the first ad score. The first ad score is rewarded with the third score when the feature value of the first frame is equal to the feature value of the second frame in the selected set of frames. In an embodiment of the present disclosure, the third score as reward to the first ad score of the first ad is 0.5. In another embodiment of the present disclosure, the third score as reward to the first ad score of the first ad is more or less than 0.5.

The advertisement detection system 104 performs a vicinity test for ascertaining neighboring frames as the ad frames of the first ad. The vicinity test is needed to robustly detect video ads of different duration. The vicinity test makes the detection length agnostic. The advertisement detection system 104 rewards the first ad score for the first ad of the one or more ads in the live stream of the media content with addition of a fourth score to the first ad score. The fourth score is rewarded on vicinity criterion and the vicinity criterion is based on successive positive validation of the first score for the first frame and the second frame of the set of frames. In an embodiment of the present disclosure, the fourth score as reward to the first ad score of the first ad is 0.5. In another embodiment of the present disclosure, the fourth score as reward to the first ad score of the first ad is more or less than 0.5. The advertisement detection system 104 calculates a progressive ad score for the first ad and the second ad. The progressive score is calculated on the basis of at least one of progressive addition and subtraction of the second score, the third score and the fourth score to the first ad score. The first ad is progressively scored for each positively validated frame to obtain the progressive ad score.

For example, let us suppose a first frame (F1) of the first ad is positively evaluated. The first ad may have an ad score of 5.5. The subsequent frames (F1 and F2) are evaluated on the basis of the vicinity criterion. The vicinity criterion is positively validated when consecutive frames in the neighborhood of the first frame (F1) are positively validated. The ad score is increased by 0.5 for each positive validation. The advertisement detection system 104 calculates the progressive score for the first ad as the sum of 3 and 0.5 as 6. The progressive score may be analyzed for a specific duration of the live stream of the media content. If the evaluated score is greater than or equal to a specified threshold score of, say 6, then the ad is said to be positively detected.

The advertisement detection system 104 detects the first ad in the live stream of the media content when the progressive score for the first ad is above a threshold score. In an embodiment of the present disclosure, the threshold score for the positive detection of the first ad is 6. In another embodiment of the present disclosure, the threshold score for the positive detection of the first ad in the live stream of the media content is more than 6. In yet another embodiment of the present disclosure, the threshold score for the positive detection of the first ad is greater than 1.5. In yet another embodiment of the present disclosure, the threshold score for the positive detection of the first ad in the live stream of the media content is based on any suitable range.

The advertisement detection system 104 detects the first ad in the live stream of the media content in a detection period ($D_P$) (as shown in FIG. 1D). The detection period ($D_P$) is evaluated as equivalent of positive frame detection for at least two consecutively selected frames per second. For example, let us suppose that for selection of 3 frames from 25 frames per second, the advertisement detection system 104 positively evaluates the first two or the last two frames as the ad frames. Moreover, the time for reception of each frame of the 3 selected frames per second is 0.33×2, i.e. 0.66 seconds and therefore, the detection period ($D_P$) for detection of each ad in the live stream of the media content is equivalent to reception of at least two frames of each ad. The detection period lies in a range of 0.6 seconds to 1 second.

Referring to FIG. 1D, the pre-defined set of frames are illustratively labeled with an index from 1 to 25 for a second of the media content from the broadcasted channel. The advertisement detection system 104 selects 3 frames from every $8^{th}$ position of 1 second of the media content. The three selected frames are labeled 8, 16 and 24 for $8^{th}$ frame, $16^{th}$ frame and $24^{th}$ frame. The detection period ($D_P$) for positive detection of the first ad in the live stream of the media content is equivalent to selection time for at least two frames of the media content. The illustrated delay between selections of every consecutively selected frame is illustrated as 0.33 seconds. The detection period ($D_P$) is at least twice of the selection time for the at least two frames. The detection period ($D_P$) is illustrated as 0.66 seconds.

The advertisement detection system 104 may ascertain a length of the first ad when the first ad score for the first ad gets penalized for a first time. The advertisement detection system 104 stores the detected ad information and associated metadata in the ad detection database 104d. The ad detection database 104d is updated with positive detection of the first ad detection in the live stream of the media content in real time.

Further, the advertisement detection system 104 may adopt the second detection strategy for the second scenario. The advertisement detection system 104 switches to the second detection strategy when the one or more watermarked features disappear from the checked frame. The second scenario pertains to sudden disappearance and reappearance of the one or more watermarked features during the airing schedule of the media content in the live stream of the broadcasted channel. The first detection strategy is computationally light and save time and computing resources against a comprehensive computing intensive first detection strategy. The second detection strategy includes detection of disappearance of the one or more watermarked features from the checked frame in the pre-defined set of frames in the live stream of the media content. The disappearance of the one or more watermarked features is performed by the advertisement detection system 104. Moreover, the advertisement detection system 104 marks the checked frame in the pre-defined set of frames as the ad frame of the first ad. The checked frame is marked as the ad frame of the first ad on the basis of positive detection of the disappearance of the one or more watermarked features from the checked frame. The advertisement detection system 104 may further implement at least one or more of the steps in the first detection strategy for derivation of ad related information. Example of the ad related information includes but may not be limited to a brand name, a tag line, a length of ad and name of advertised product or service.

It may be noted that in FIG. 1A, FIG. 1B, FIG. 1C and FIG. 1D, the advertisement detection system 104 detects the one or more ads in the media content of a specific channel; however, those skilled in the art would appreciate that the advertisement detection system 104 detects the one or more ads from more number of channels in the real time.

FIG. 2A illustrates a block diagram 200 of the advertisement detection system 104, in accordance with an embodiment of the present disclosure. The block diagram 200 describes the advertisement detection system 104. The advertisement detection system 104 adaptively switches to the first detection strategy for robustly detecting the first ad in the live stream of the media content. The live stream of the media content for the broadcasted channel is received and processed through implementation of computer vision, feature extraction; statistical learning techniques. The supervised detection of televised video advertisements is facilitated by real time collection of features and development of statistical models. The media content in the live stream of the channel is selectively processed frame by frame and robust statistical learning models are developed over the selectively processed frames of the media content. The robust statistical learning models are parametrically analyzed and prominent and prospective features are classified and compared for an improvement in time and error rate of detection of the televised video ads.

The block diagram 200 of the advertisement detection system 104 includes a reception module 202, a selection module 204, a checking module 206 and a switching module 208.

The reception module 202 receives the live stream of the media content from the broadcasted channel. The live stream of the media content includes of a live ad stream and a non-ad stream. The media content of the live stream may be digitally watermarked with the one or more watermarked features. The one or more watermarked features in the selected frame include at least one of the channel logo, the content logo, the content certificate and the ad certificate (as discussed in detailed description of FIG. 1A). Further, the selection module 204 selects the set of frames per second from the pre-defined set of frames in each second of the live stream of the media content. Each selected frame in the selected set of frames differs by a frame gap of at least 8 frames. In an example, the set of frames is 3 per second from a 25 frames per second of the live stream of the media content (as discussed in the detailed description of FIG. 1A).

The checking modole 206 checks for one or more watermarked features in each selected frame of the set of frames in the live stream of the media content. The switching module 208 switches to the first detection strategy when the one or more watermarked feature are present in each checked frame throughout the airing of the media content on the broadcasted channel. The switching module implements the first detection strategy. The first detection strategy includes extraction of the pre-defined number of keypoints from each selected frame. Each extracted keypoint is characterized by a spatial position in selected frame. The pre-defined number of key points is extracted based on validation of at least one of scale invariance criterion, a rotation invariance criterion and Harris score criterion. In an embodiment of the present disclosure, the pre-defined number of keypoints is 700 (as discussed in detailed description of FIG. 1A). Further, the first detection strategy includes derivation of the pre-defined number of binary descriptors from pre-defined number of extracted keypoints. Each binary descriptor is characterized by a binary string with a length of 256 bits (as discussed in detailed description of FIG. 1A). The first detection strategy includes the assignment of the weight value to each binary descriptor of the pre-defined number of binary descriptors. The weight value for each binary descriptor is L1 normalized. Each normalized weight value for each binary descriptor is characterized by an arithmetic sum of 1 (as discussed in detailed description of FIG. 1A).

The first detection strategy includes the creation of the special pyramid of the pre-defined number of derived descriptors to obtain the pre-defined number of spatially identifiable binary descriptors. The special pyramid of the pre-defined number of binary descriptors includes one or more copies of derived binary descriptors. Each binary descriptor in the special pyramid is tagged with an identifier for spatially segregating and validating position of each binary descriptor in the selected frame (as discussed in the detailed description of FIG. 1A). The first detection strategy includes the normalization of each weight value for each binary descriptor in the special pyramid of the pre-defined number of spatially identifiable binary descriptors. Each weight value in the special pyramid is L1 normalized such that the arithmetic sum of the weight values is 1 (as discussed in the detailed description of FIG. 1A). The special pyramid is created for obtaining the first vocabulary of binary descriptors of each selected frame. The first vocabulary of binary descriptors corresponds to the pre-defined number of spatially identifiable binary descriptors (as discussed in the detailed description of FIG. 1A).

The first detection strategy includes the access to the second vocabulary of binary descriptors from the comprehensive set of televised advertisements. The second vocabulary of binary descriptors corresponds to the curated comprehensive repository of the ad frames. The second vocabulary of the binary descriptors is characterized by the n-ary tree data structure with leaf nodes. The second vocabulary includes the set of tree structured clusters of binary descriptors as the leaf nodes and associated with weight values. The second vocabulary of the binary descriptors is created from extraction of the pre-defined number of keypoints and the binary descriptors from each frame of the repository of ad frames. The special pyramid of the descriptors is created for each ad frame to obtain the pre-defined number of spatially identifiable binary descriptors. The binary descriptors are clustered into the first set of clusters. The binary descriptors are clustered into the first set of clusters based on the evaluation of minimum hamming distance between each binary descriptor. The binary descriptors in each cluster of the first set of clusters are iteratively clustered. Each subsequent cluster is clustered for the pre-determined iteration level to obtain the set of tree structured clusters. In an embodiment of the present disclosure, the pre-determined iteration level is 6. The weight value, the term frequency and the inverse document frequency are assigned to each clustered binary descriptor and each weight value is normalized using L1 normalization such that the evaluated arithmetic sum of weight values is 1 (as discussed in the detailed description of FIG. 1A).

The first detection strategy includes the comparison of each spatially identifiable binary descriptor from the first vocabulary of each selected frame with the plurality of spatially identifiable binary descriptors in the at least one or more clusters. The one or more clusters are searched from the set of tree structured clusters. The set of tree structured clusters corresponds to the second vocabulary of the binary descriptors of the repository of the ad frames. The binary descriptors in the first vocabulary are compared with the second vocabulary (as described in the detailed description of FIG. 1A).

The first detection strategy includes progressively scoring of each selected frame in the live stream of media content for the validation of the selected frame as the ad frame of the first ad. The first ad is progressively scored for each positively validated frame to obtain the progressive ad score (as described in the detailed description of FIG. 1A). In addition, the first detection strategy includes the detection of the first ad in the live stream of the media content when the progressive score for the first ad is above a threshold score. In an example, the threshold score for positive detection of the first ad in the live stream of the media content is 6 (as described in the detailed description of FIG. 1A).

FIG. 2B illustrates a block diagram 200 of the advertisement detection system 104, in accordance with another embodiment of the present disclosure. The block diagram 200 describes the advertisement detection system 104. The advertisement detection system 104 adaptively switches to the second detection strategy for robustly detecting the first ad in the live stream of the media content.

The block diagram 200 includes the reception module 202, the selection module 204, the checking modole 206 and a switching module 210. The reception module 202 receives the live stream of the media content from the broadcasted channel. The live stream of the media content includes of a live ad stream and a non-ad stream. The media content of the live stream may be digitally watermarked with the one or more watermarked features. The one or more watermarked features in the selected frame include at least one of the channel logo, the content logo, the content certificate and the ad certificate (as discussed in detailed description of FIG. 1A). Further, the selection module 204 selects the set of frames per second from the pre-defined set of frames in each second of the live stream of the media content. Each selected frame in the selected set of frames differs by a frame gap of at least 8 frames. In an example, the set of frames is 3 per second from a 25 frames per second of the live stream of the media content (as discussed in the detailed description of FIG. 1A).

The checking modole 206 checks for one or more watermarked features in each selected frame of the set of frames in the live stream of the media content. The switching module 208 switches to the second detection strategy when the one or more watermarked features disappear from the checked frame during the airing of the scheduled program. The switching module 210 implements the second detection strategy for detecting the first ad in the live stream of the media content. The second detection strategy includes the detection of the disappearance of the one or more watermarked features from the checked frame of the media content. Moreover, the second detection strategy includes marking of the checked frame in the pre-defined set of frames as the ad frame of the first ad. The checked frame is marked as the ad frame of the first ad based on the positive detection of the disappearance of the one or more watermarked features from the checked frame. The advertisement detection system 104 may further implement at least one or more of steps described in the first detection strategy for deriving ad information of the detected first ad (as described in the detailed description of FIG. 1A).

FIG. 3 illustrates a flow chart 300 for adaptively switching supervised detection strategy for watermarked and non-watermarked real time televised video advertisements, in accordance with various embodiments of the present disclosure. It may be noted that to explain the process steps of the flowchart 300, references will be made to the interactive messaging system elements of the FIG. 1A, FIG. 1B, FIG. 1C, FIG. 1D and FIG. 2.

The flowchart 300 initiates at step 302. At step 304, the selection module 204 selects the set of frames per second from the pre-defined set of frames in each second of the live stream of the media content. Each selected frame in the selected set of frames differs by a frame gap of at least 8 frames.

At step 306, the checking modole 206 checks for one or more watermarked features in each selected frame of the set of frames in the live stream of the media content.

At step 308, the switching module 208 switches to the first detection strategy when the one or more watermarked feature are present in each checked frame throughout the airing of the media content on the broadcasted channel. The switching module implements the first detection strategy. The first detection strategy includes extraction of the pre-defined number of keypoints from each selected frame. Each extracted keypoint is characterized by a spatial position in selected frame. The pre-defined number of key points is extracted based on validation of at least one of scale invariance criterion, a rotation invariance criterion and Harris score criterion. In an embodiment of the present disclosure, the pre-defined number of keypoints is 700 (as discussed in detailed description of FIG. 1A). Further, the first detection strategy includes derivation of the pre-defined number of binary descriptors from pre-defined number of extracted keypoints. Each binary descriptor is characterized by a binary string with a length of 256 bits (as discussed in detailed description of FIG. 1A). The first detection strategy includes the assignment of the weight value to each binary descriptor of the pre-defined number of binary descriptors. The weight value for each binary descriptor is L1 normalized. Each normalized weight value for each binary descriptor is characterized by an arithmetic sum of 1 (as discussed in detailed description of FIG. 1A).

The first detection strategy includes the creation of the special pyramid of the pre-defined number of derived descriptors to obtain the pre-defined number of spatially identifiable binary descriptors. The special pyramid of the pre-defined number of binary descriptors includes one or more copies of derived binary descriptors. Each binary descriptor in the special pyramid is tagged with an identifier for spatially segregating and validating position of each binary descriptor in the selected frame (as discussed in the detailed description of FIG. 1A). The first detection strategy includes the normalization of each weight value for each binary descriptor in the special pyramid of the pre-defined number of spatially identifiable binary descriptors. Each weight value in the special pyramid is L1 normalized such that the arithmetic sum of the weight values is 1 (as discussed in the detailed description of FIG. 1A). The special pyramid is created for obtaining the first vocabulary of binary descriptors of each selected frame. The first vocabulary of binary descriptors corresponds to the pre-defined number of spatially identifiable binary descriptors (as discussed in the detailed description of FIG. 1A).

The first detection strategy includes the access to the second vocabulary of binary descriptors from the comprehensive set of televised advertisements. The second vocabulary of binary descriptors corresponds to the curated comprehensive repository of the ad frames. The second vocabulary of the binary descriptors is characterized by the n-ary tree data structure with leaf nodes. The second vocabulary includes the set of tree structured clusters of binary descriptors as the leaf nodes and associated with weight values. The second vocabulary of the binary descriptors is created from extraction of the pre-defined number of keypoints and the binary descriptors from each frame of the repository of ad frames. The special pyramid of the descriptors is created for each ad frame to obtain the pre-defined number of spatially identifiable binary descriptors. The binary descriptors are clustered into the first set of clusters. The binary descriptors are clustered into the first set of clusters based on the evaluation of minimum hamming distance between each binary descriptor. The binary descriptors in each cluster of the first set of clusters are iteratively clustered. Each subsequent cluster is clustered for the pre-determined iteration level to obtain the set of tree structured clusters. In an embodiment of the present disclosure, the pre-determined iteration level is 6. The weight value, the term frequency and the inverse document frequency are assigned to each clustered binary descriptor and each weight value is normalized using L1 normalization such that the evaluated arithmetic sum of weight values is 1 (as discussed in the detailed description of FIG. 1A).

The first detection strategy includes the comparison of each spatially identifiable binary descriptor from the first vocabulary of each selected frame with the plurality of spatially identifiable binary descriptors in the at least one or more clusters. The one or more clusters are searched from the set of tree structured clusters. The set of tree structured clusters corresponds to the second vocabulary of the binary descriptors of the repository of the ad frames. The binary descriptors in the first vocabulary are compared with the second vocabulary (as described in the detailed description of FIG. 1A).

The first detection strategy includes progressively scoring of each selected frame in the live stream of media content for the validation of the selected frame as the ad frame of the first ad. The first ad is progressively scored for each positively validated frame to obtain the progressive ad score (as described in the detailed description of FIG. 1A). In addition, the first detection strategy includes the detection of the first ad in the live stream of the media content when the progressive score for the first ad is above a threshold score. In an example, the threshold score for positive detection of the first ad in the live stream of the media content is 6 (as described in the detailed description of FIG. 1A).

It may be noted that the flowchart 300 is explained to have above stated process steps; however, those skilled in the art would appreciate that the flowchart 300 may have more/less number of process steps which may enable all the above stated embodiments of the present disclosure.

FIG. 4 illustrates a block diagram of a computing device 400, in accordance with various embodiments of the present disclosure. The computing device 400 includes a bus 402 that directly or indirectly couples the following devices: memory 404, one or more processors 406, one or more presentation components 408, one or more input/output (I/O) ports 410, one or more input/output components 412, and an illustrative power supply 414. The bus 402 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 4 is merely illustrative of an exemplary computing device 300 that can be used in connection with one or more embodiments of the present invention. Distinction is not made between such categories as "workstation," "server," "laptop," "hand-held device," etc., as all are contemplated within the scope of FIG. 4 and reference to "computing device."

The computing device 400 typically includes a variety of computer-readable media. The computer-readable media can be any available media that can be accessed by the computing device 400 and includes both volatile and non-volatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data. The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 400. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 404 includes computer-storage media in the form of volatile and/or nonvolatile memory. The memory 404 may be removable, non-removable, or a combination thereof. Exemplary hardware devices include solid-state memory, hard drives, optical-disc drives, etc. The computing device 400 includes one or more processors that read data from various entities such as memory 404 or I/O components 412. The one or more presentation components 408 present data indications to a user or other device. Exemplary presentation components include a display device, speaker, printing component, vibrating component, etc. The one or more I/O ports 410 allow the computing device 400 to be logically coupled to other devices including the one or more I/O components 412, some of which may be built in. Illustrative components include a microphone, joystick, game pad, satellite dish, scanner, printer, wireless device, etc.

The present disclosure has numerous disadvantages over the prior art. The adoption of adaptive switching strategy saves computing resources and time for detecting specific type of televised ads with watermarked features disappearing suddenly during the airing of televised advertisements. The present disclosure solves the problem of larger detection time of at least 7 seconds for a 15 second to 30 second ad. The present disclosure provides a statistical and parametric method for robust detection of televised ads across many broadcast channels in a very short duration of 0.6 seconds to 1 second against earlier detection time of at least 7 seconds. The detection is progressive with a very low error rate in false detection and computationally light weighted. The video ads are detected within reception of first two frames of the live stream. The detection is agnostic to platform, broadcast channel, receiving hardware, ad length and noise. The detection is supported by highly efficient database management, supervised machine learning and advanced custom computer vision techniques. The binary descriptors are selected after efficient consideration of feature redundancy, rotational invariance, translational invariance and Harris score. The use of validation criterion on the basis of progressively awarded and penalized ad scores with each positive and negative validation provides a robust means to ascertain whether the detection media is an ad video.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed:

1. A computer-implemented method for adaptively switching supervised detection strategy for watermarked and non-watermarked real time televised video advertisements in a live stream of a media content of a broadcasted channel, the computer-implemented method comprising:

selecting, at an advertisement detection system with a processor, a set of frames per second from a pre-defined set of frames in each second of the live stream of the media content;

checking, at the advertisement detection system with the processor, for one or more watermarked features in each selected frame of the set of frames in the live stream of the media content;

switching, at the advertisement detection system with the processor, to a first detection strategy of detecting a first ad in the live stream of the media content when the one or more watermarked feature being present in each checked frame in the selected set of frames, wherein the first detection strategy comprises:

extracting a pre-defined number of keypoints from each selected frame of the media content, wherein the pre-defined number of keypoints is extracted based on validation of at least one of scale invariance criterion, a rotation invariance criterion and a Harris score criterion;

deriving a pre-defined number of binary descriptors from the corresponding pre-defined number of extracted keypoints, wherein each binary descriptor is characterized by a binary string with a length of 256 bits;

assigning a weight value to each binary descriptor of the pre-defined number of binary descriptors, wherein the weight value corresponding to each binary descriptor is L1 normalized and wherein each normalized weight value corresponding to each binary descriptor is characterized by an arithmetic sum of 1;

creating a special pyramid of the pre-defined number of binary descriptors to obtain a pre-defined number of spatially identifiable binary descriptors, the special pyramid being created for obtaining a first vocabulary of binary descriptors corresponding to the pre-defined number of spatially identifiable binary descriptors of each selected frame;

accessing a second vocabulary of binary descriptors corresponding to a curated comprehensive repository of ad frames from a comprehensive set of televised advertisements, wherein the second vocabulary comprises a set of tree structured clusters of binary descriptors;

comparing each spatially identifiable binary descriptor from the pre-defined number of binary descriptors corresponding to the first vocabulary of each selected frame with a plurality of spatially identifiable binary descriptors in at least one or more clusters of the set of tree structured clusters corresponding to the second vocabulary of the binary descriptors of the repository of the ad frames progressively scoring each selected frame from the live stream of the media content for validation of the selected frame as the ad frame of a first ad, wherein the first ad is progressively scored for each positively validated frame to obtain a progressive ad score; and detecting the first ad in the live stream of the media content when the progressive score for the first ad being above a threshold score.

2. The computer-implemented method as recited in claim 1, further comprising receiving, at the advertisement detection system with the processor, the live stream of the media content of the broadcasted channel, the live stream of the media content comprises of a live ad stream and a non-ad stream and the live ad stream comprises one or more ads.

3. The computer-implemented method as recited in claim 1, wherein each selected frame in the selected pre-defined set of frames differ by a frame gap of at least 8 frames, wherein the set of frames selected from the pre-defined set of frames in the live stream of media content per second is 3 and the pre-defined set of frames per second in the live stream is 25 and wherein the pre-defined number of keypoints is 700, the pre-defined number of descriptors is 700 when the pre-defined number of keypoints is 700 and the pre-defined number of spatially identifiable binary descriptors is 2100.

4. The computer-implemented method as recited in claim 1, further comprising switching, at the advertisement detection system with the processor, to a second detection strategy of detecting the first ad in the live stream of the media content when the one or more watermarked features disappear from the checked frame, wherein the second detection strategy comprises:
  detecting disappearance of the one or more watermarked features from the checked frame in the pre-defined set of frames in the live stream of the media content; and
  marking the checked frame in the pre-defined set of frames as the ad frame of the first ad, the checked frame being marked as the ad frame of the first ad based on positive detection of the disappearance of the one or more watermarked features from the checked frame.

5. The computer-implemented method as recited in claim 1, wherein the one or more watermarked features in the selected frame comprises at least one of a channel logo, a content logo, a content certificate and an ad certificate.

6. The computer-implemented method as recited in claim 1, wherein the second vocabulary of the binary descriptors is characterized by an n-ary tree data structure comprising of leaf nodes, wherein the second vocabulary of the binary descriptors is created by:
  extracting the pre-defined number of keypoints and corresponding binary descriptors from each frame of the repository of ad frames;
  creating the special pyramid of the descriptors for each ad frame to obtain the pre-defined number of spatially identifiable binary descriptors;
  clustering the binary descriptors into a first set of clusters, the binary descriptors being clustered into the first set of clusters based on an evaluation of minimum hamming distance between each binary descriptor;
  iteratively clustering the binary descriptors in each cluster of the first set of clusters and each subsequent cluster for a pre-determined iteration level to obtain a set of tree structured clusters; and
  assigning a weight value to each clustered binary descriptor based on a term frequency and an inverse document frequency and normalizing the weight values using L1 normalization, the weight value being normalized for an evaluated arithmetic sum of weight values as 1.

7. The computer-implemented method as recited in claim 6, wherein each cluster in the first set of clusters and the set of tree structured clusters is associated with a centroid, wherein the first set of cluster comprises 10 clusters and corresponding 10 centroids and the second set of tree structured clusters comprises $10^6$ clusters and $10^6$ centroids and wherein the pre-determined iteration level for clustering binary descriptors corresponding to each frame of the repository of ad frames is 6.

8. The computer-implemented method as recited in claim 1, wherein the binary descriptors in the first vocabulary is compared with the binary descriptors in the second vocabulary by:
  searching for a cluster in the set of tree structured clusters comprising binary descriptors with minimum hamming distances with the corresponding binary descriptors of the selected frame in the live stream of the media content;
  matching each binary descriptor from the first vocabulary of the binary descriptors for the selected frame of the media content with the binary descriptor in the searched cluster for the minimum hamming distance;
  calculating Bhattacharya distance between weight values of each matched pair of the binary descriptors; and
  summing calculated Bhattacharya distance for each descriptor in the first vocabulary of the binary descriptors corresponding to the selected frame of the media content to obtain a summed feature value, wherein the summed feature values being in a normalized range of 0 to 1.

9. The computer-implemented method as recited in claim 1, wherein each selected frame for the first ad in the live stream of the media content is progressively scored in at least one or more steps, the one or more steps comprises:
  comparing the summed feature value for each selected frame with a first threshold value for validating the selected frame as the ad frame;
  evaluating a ratio test for determining degree of difference between each selected frame in the selected set of frames in the live stream of the media content, wherein the ratio test is evaluated by dividing the summed feature value for a second frame by the corresponding summed feature value for a first frame in the selected set of frames;
  rewarding a first ad of one or more ads in the live stream of the media content by assigning a first ad score for a positive validation of the evaluated ratio, wherein the first ad score is assigned to the first ad when the ratio is less than a second threshold value;
  penalizing a second ad of the one or more ads in the live stream of the media content by deducting a second score from the assigned first ad score for the second ad, wherein the second ad is a past ad streamed before the first ad and wherein the first ad is streamed in real time in the live stream of the media content;
  rewarding the first ad of the one or more ads in the live stream of the media content by adding a third score to the first ad score of the first ad, wherein the third score is rewarded based on an equality criterion and wherein the equality criterion is based on equality of the feature value of the first frame and the feature value of the second frame in the selected set of frames;
  rewarding the first ad of the one or more ads in the live stream of the media content by adding a fourth score to the first ad score of the first ad, wherein the fourth score is rewarded based on a vicinity criterion and wherein the vicinity criterion is based on successive positive validation of the selected set of frames; and
  calculating the progressive ad score for the first ad and the second ad based on at least one of progressive addition and subtraction of the second score, the third score and the fourth score from the first ad score.

10. The computer-implemented method as recited in claim 9, wherein the first threshold value for validating comparison of the summed feature value is 0.02 and the second threshold value for validation of the evaluated ratio is 0.7, wherein the first ad score for positive validation by the ratio test is 1.5, the second score for penalizing the second ad is 0.5, the third score for the equality criterion is 0.5 and the fourth score for the vicinity criterion is 0.5.

11. The computer-implemented method as recited in claim 1, wherein the threshold score for the detection of the first ad in the live stream of the media content is 6.

12. A computer system comprising:
  one or more processors; and
  a memory coupled to the one or more processors, the memory for storing instructions which, when executed by the one or more processors, cause the one or more processors to perform a method for adaptively switching supervised detection strategy for watermarked and non-watermarked real time televised video advertisements in a live stream of a media content of a broadcasted channel, the method comprising:

selecting, at an advertisement detection system, a set of frames per second from a pre-defined set of frames in each second of the live stream of the media content;

checking, at the advertisement detection system, for one or more watermarked features in each selected frame of the set of frames in the live stream of the media content;

switching, at the advertisement detection system, to a first detection strategy of detecting a first ad in the live stream of the media content when the one or more watermarked feature being present in each checked frame in the selected set of frames, wherein the first detection strategy comprises:

extracting a pre-defined number of keypoints from each selected frame of the media content, wherein the pre-defined number of keypoints is extracted based on validation of at least one of scale invariance criterion, a rotation invariance criterion and a Harris score criterion;

deriving a pre-defined number of binary descriptors from the corresponding pre-defined number of extracted keypoints, wherein each binary descriptor is characterized by a binary string with a length of 256 bits;

assigning a weight value to each binary descriptor of the pre-defined number of binary descriptors, wherein the weight value corresponding to each binary descriptor is L1 normalized and wherein each normalized weight value corresponding to each binary descriptor is characterized by an arithmetic sum of 1;

creating a special pyramid of the pre-defined number of binary descriptors to obtain a pre-defined number of spatially identifiable binary descriptors, the special pyramid being created for obtaining a first vocabulary of binary descriptors corresponding to the pre-defined number of spatially identifiable binary descriptors of each selected frame;

accessing a second vocabulary of binary descriptors corresponding to a curated comprehensive repository of ad frames from a comprehensive set of televised advertisements, wherein the second vocabulary comprises a set of tree structured clusters of binary descriptors;

comparing each spatially identifiable binary descriptor from the pre-defined number of binary descriptors corresponding to the first vocabulary of each selected frame with a plurality of spatially identifiable binary descriptors in at least one or more clusters of the set of tree structured clusters corresponding to the second vocabulary of the binary descriptors of the repository of the ad frames progressively scoring each selected frame from the live stream of media content for validation of the selected frame as the ad frame of a first ad, wherein the first ad is progressively scored for each positively validated frame to obtain a progressive ad score; and detecting the first ad in the live stream of the media content when the progressive score for the first ad being above a threshold score.

13. The computer system as recited in claim 12, further comprising receiving, at the advertisement detection system, the live stream of the media content of the broadcasted channel, the live stream of the media content comprises of a live ad stream and a non-ad stream and the live ad stream comprises one or more ads.

14. The computer system as recited in claim 12, further comprising switching, at the advertisement detection system, to a second detection strategy of detecting the first ad in the live stream of the media content when the one or more watermarked features disappear from the checked frame, wherein the second detection strategy comprises:

detecting disappearance of the one or more watermarked features from the checked frame in the pre-defined set of frames in the live stream of the media content; and marking the checked frame in the pre-defined set of frames as the ad frame of the first ad, the checked frame being marked as the ad frame of the first ad based on positive detection of the disappearance of the one or more watermarked features from the checked frame.

15. The computer system as recited in claim 12, wherein the one or more watermarked features in the selected frame comprises at least one of a channel logo, a content logo, a content certificate and an ad certificate.

16. The computer system as recited in claim 12, wherein the second vocabulary of the binary descriptors is characterized by an n-ary tree data structure comprising of leaf nodes, wherein the second vocabulary of the binary descriptors is created by:

extracting the pre-defined number of keypoints and corresponding binary descriptors from each frame of the repository of ad frames;

creating the special pyramid of the descriptors for each ad frame to obtain the pre-defined number of spatially identifiable binary descriptors;

clustering the binary descriptors into a first set of clusters, the binary descriptors being clustered into the first set of clusters based on an evaluation of minimum hamming distance between each binary descriptor;

iteratively clustering the binary descriptors in each cluster of the first set of clusters and each subsequent cluster for a pre-determined iteration level to obtain a set of tree structured clusters; and assigning a weight value to each clustered binary descriptor based on a term frequency and an inverse document frequency and normalizing the weight values using L1 normalization, the weight value being normalized for an evaluated arithmetic sum of weight values as 1.

17. The computer system as recited in claim 12, wherein the binary descriptors in the first vocabulary is compared with the binary descriptors in the second vocabulary by:

searching for a cluster in the set of tree structured clusters comprising binary descriptors with minimum hamming distances with the corresponding binary descriptors of the selected frame in the live stream of the media content;

matching each binary descriptor from the first vocabulary of the binary descriptors for the selected frame of the media content with the binary descriptor in the searched cluster for the minimum hamming distance;

calculating Bhattacharya distance between weight values of each matched pair of the binary descriptors; and summing calculated Bhattacharya distance for each descriptor in the first vocabulary of the binary descriptors corresponding to the selected frame of the media content to obtain a summed feature value, wherein the summed feature values is in a normalized range of 0 to 1.

18. The computer system as recited in claim 12, wherein each selected frame for the first ad in the live stream of the media content is progressively scored in at least one or more steps, the one or more steps comprises:

comparing the summed feature value for each selected frame with a first threshold value for validating the selected frame as the ad frame;

evaluating a ratio test for determining degree of difference between each selected frame in the selected set of frames in the live stream of the media content, wherein the ratio test is evaluated by dividing the summed feature value for a second frame by the corresponding summed feature value for a first frame in the selected set of frames;

rewarding a first ad of one or more ads in the live stream of the media content by assigning a first ad score for a positive validation of the evaluated ratio, wherein the first ad score is assigned to the first ad when the ratio is less than a second threshold value;

penalizing a second ad of the one or more ads in the live stream of the media content by deducting a second score from the assigned first ad score for the second ad, wherein the second ad is a past ad streamed before the first ad and wherein the first ad is streamed in real time in the live stream of the media content;

rewarding the first ad of the one or more ads in the live stream of the media content by adding a third score to the first ad score of the first ad, wherein the third score is rewarded based on an equality criterion and wherein the equality criterion is based on equality of the feature value of the first frame and the feature value of the second frame in the selected set of frames;

rewarding the first ad of the one or more ads in the live stream of the media content by adding a fourth score to the first ad score of the first ad, wherein the fourth score is rewarded based on a vicinity criterion and wherein the vicinity criterion is based on successive positive validation of the selected set of frames; and calculating the progressive ad score for the first ad and the second ad based on at least one of progressive addition and subtraction of the second score, the third score and the fourth score from the first ad score.

\* \* \* \* \*